(12) United States Patent
Almog

(10) Patent No.: US 12,128,304 B2
(45) Date of Patent: Oct. 29, 2024

(54) ALTERING COMPUTER GAME TILES HAVING MULTIPLE MATCHABLE ENDS

(71) Applicant: Superplay Ltd, Tel Aviv (IL)

(72) Inventor: Gilad Almog, Tel Aviv (IL)

(73) Assignee: Superplay Ltd, Tel Aviv (IL)

( * ) Notice: Subject to any disclaimer, the term of this patent is extended or adjusted under 35 U.S.C. 154(b) by 160 days.

(21) Appl. No.: 17/852,577

(22) Filed: Jun. 29, 2022

(65) Prior Publication Data

US 2024/0001231 A1    Jan. 4, 2024

(51) Int. Cl.
| | |
|---|---|
| A63F 13/52 | (2014.01) |
| A63F 13/55 | (2014.01) |
| A63F 13/537 | (2014.01) |
| A63F 13/80 | (2014.01) |
| G06F 3/0482 | (2013.01) |

(52) U.S. Cl.
CPC .............. *A63F 13/52* (2014.09); *A63F 13/55* (2014.09); *A63F 13/537* (2014.09); *A63F 13/80* (2014.09); *A63F 2300/63* (2013.01); *G06F 3/0482* (2013.01)

(58) Field of Classification Search
CPC ........ A63F 13/52; A63F 13/55; A63F 13/537; A63F 13/80; A63F 2300/63; G06F 3/0482
See application file for complete search history.

(56) References Cited

U.S. PATENT DOCUMENTS

| | | | | |
|---|---|---|---|---|
| 4,474,371 A | * | 10/1984 | Silbermintz | A63F 9/0073 |
| | | | | 273/153 S |
| 4,630,831 A | * | 12/1986 | Stadden | A63F 9/20 |
| | | | | 273/292 |
| 4,778,188 A | * | 10/1988 | Brooker | A63F 9/20 |
| | | | | 273/306 |
| 4,830,376 A | * | 5/1989 | Hillis | A63F 9/10 |
| | | | | 273/157 R |
| 5,016,889 A | * | 5/1991 | Moss | A63F 9/20 |
| | | | | 273/293 |
| 5,054,789 A | * | 10/1991 | Pellerin | A63F 3/0423 |
| | | | | 273/288 |
| 5,230,518 A | * | 7/1993 | Crowe | A63F 3/0423 |
| | | | | 273/299 |
| 5,265,888 A | * | 11/1993 | Yamamoto | A63F 13/80 |
| | | | | 463/10 |

(Continued)

OTHER PUBLICATIONS

Notice of Allowance Dated Oct. 5, 2023 from the US Patent and Trademark Office Re. U.S. Appl. No. 18/212,732. (22 pages).

*Primary Examiner* — David L Lewis
*Assistant Examiner* — Matthew D Hoel

(57) ABSTRACT

Disclosed herein are systems and methods for altering display of selectable objects having multiple matchable ends in a computer game, comprising displaying a plurality of selectable objects of a computer game displayed by a client device, each of the plurality of selectable objects initially has a plurality of separable ends, each of the plurality of separable ends of each of the plurality of selectable objects is marked with one of a plurality of patterns, receiving user input comprising a match indication of one or more matches between separable ends of at least two of the selectable objects marked with a common pattern, and altering the display of one or more of the at least two selectable objects by breaking away and removing the matched separable end in case the match(es) indicated by the match indication is correct.

13 Claims, 11 Drawing Sheets

(56) References Cited

U.S. PATENT DOCUMENTS

| | | | | |
|---|---|---|---|---|
| 5,301,953 A * | 4/1994 | Levin | A63F 3/00 | 273/276 |
| 5,314,191 A * | 5/1994 | Mayas | A63F 3/0423 | 273/272 |
| 5,393,062 A * | 2/1995 | Cember | A63F 3/0421 | 434/167 |
| 5,931,472 A * | 8/1999 | Ko | A63F 3/00157 | 273/292 |
| RE36,675 E * | 4/2000 | Yamamoto | A63F 13/48 | 463/10 |
| 6,070,876 A * | 6/2000 | Ko | A63F 3/00157 | 273/293 |
| 6,113,100 A * | 9/2000 | Mu | A63F 9/28 | 273/309 |
| 6,244,959 B1 * | 6/2001 | Miyamoto | A63F 13/822 | 463/31 |
| 6,256,047 B1 * | 7/2001 | Isobe | G06T 17/00 | 463/2 |
| 6,375,572 B1 * | 4/2002 | Masuyama | A63F 13/92 | 463/31 |
| 6,398,641 B1 * | 6/2002 | Yamagami | A63F 9/10 | 463/9 |
| 6,402,151 B1 * | 6/2002 | Forrester | A63F 3/00697 | 273/293 |
| 6,458,032 B1 * | 10/2002 | Yamagami | A63F 9/0612 | 463/9 |
| 6,540,611 B1 * | 4/2003 | Nagata | A63F 13/833 | 463/31 |
| 6,705,614 B1 * | 3/2004 | Kyle | A63F 3/00157 | 273/274 |
| 6,708,973 B1 * | 3/2004 | Hall, Jr. | A63F 3/00176 | 273/157 R |
| 7,094,147 B2 * | 8/2006 | Nakata | A63F 13/52 | 463/31 |
| 7,425,175 B2 * | 9/2008 | Nakano | A63F 13/80 | 463/9 |
| 7,686,693 B2 * | 3/2010 | Danieli | A63F 13/215 | 709/204 |
| 7,695,406 B2 * | 4/2010 | Waters | A63F 13/22 | 482/8 |
| 7,717,781 B2 * | 5/2010 | Hattori | A63F 13/537 | 463/31 |
| 7,749,060 B1 * | 7/2010 | Olmes, III | A63F 3/00 | 273/273 |
| 7,775,866 B2 * | 8/2010 | Mizuguchi | A63F 13/80 | 463/9 |
| 7,819,739 B2 * | 10/2010 | Irwin, Jr. | A63F 3/0665 | 273/237 |
| 7,867,075 B2 * | 1/2011 | Irwin, Jr. | G07F 17/3218 | 463/19 |
| 7,878,891 B2 * | 2/2011 | Chiu | A63F 13/80 | 463/9 |
| 7,959,503 B2 * | 6/2011 | Streeter | A63F 3/0645 | 235/487 |
| 8,066,571 B2 * | 11/2011 | Koster | A63F 13/79 | 463/43 |
| 8,096,879 B2 * | 1/2012 | Takeda | A63F 13/80 | 463/31 |
| 8,105,143 B2 * | 1/2012 | Hagiwara | A63F 13/426 | 463/9 |
| 8,128,476 B1 * | 3/2012 | Sidhu | A63F 3/00643 | 463/16 |
| 8,128,501 B2 * | 3/2012 | Theimer | A63F 13/35 | 463/42 |
| 8,167,721 B2 * | 5/2012 | Fujisawa | A63F 13/98 | 463/36 |
| 8,313,370 B2 * | 11/2012 | Rogers | A63F 13/67 | 463/7 |
| 8,317,582 B2 * | 11/2012 | Nagaoka | A63F 13/80 | 463/9 |
| 8,357,045 B2 * | 1/2013 | Youm | A63F 13/497 | 463/4 |
| 8,366,527 B2 * | 2/2013 | Takeda | A63F 13/80 | 463/31 |
| 8,430,755 B2 * | 4/2013 | Youm | A63F 13/795 | 463/43 |
| 8,444,490 B2 * | 5/2013 | Youm | A63F 13/795 | 463/4 |
| 8,444,492 B2 * | 5/2013 | Youm | A63F 13/87 | 463/42 |
| 8,480,464 B2 * | 7/2013 | Fujimoto | A63F 9/0612 | 463/9 |
| 8,496,531 B2 * | 7/2013 | Youm | A63F 13/77 | 700/91 |
| 8,517,834 B2 * | 8/2013 | Krzeslo | A63F 13/45 | 463/9 |
| 8,556,713 B2 * | 10/2013 | Pilip | A63F 13/63 | 463/29 |
| 8,602,859 B2 * | 12/2013 | Nomura | A63F 13/58 | 463/9 |
| 8,632,072 B2 * | 1/2014 | Loveland | A63F 9/1204 | 273/157 R |
| 8,715,077 B2 * | 5/2014 | Paradise | A63F 13/30 | 463/31 |
| 8,721,413 B2 * | 5/2014 | Mohammed | A63F 9/10 | 463/9 |
| 8,745,138 B2 * | 6/2014 | Feng | A63F 13/12 | 709/204 |
| 8,784,181 B2 * | 7/2014 | Caputo | A63F 13/55 | 463/16 |
| 8,862,523 B2 * | 10/2014 | Richardson | G06N 20/00 | 709/217 |
| 9,100,249 B2 * | 8/2015 | Koster | H04L 67/131 | |
| 9,138,641 B2 * | 9/2015 | Rogers | G06T 7/60 | |
| 9,153,075 B2 * | 10/2015 | Ueno | G06F 3/011 | |
| 9,186,587 B2 * | 11/2015 | Jalili | A63F 9/24 | |
| 9,216,344 B1 * | 12/2015 | Peale | A63F 9/20 | |
| 9,218,717 B2 * | 12/2015 | Indrakumar | G07F 17/3258 | |
| 9,259,647 B2 * | 2/2016 | Tada | A63F 13/46 | |
| 9,295,914 B2 * | 3/2016 | Almog | A63F 13/48 | |
| 9,327,190 B2 * | 5/2016 | Yoshizawa | A63F 13/45 | |
| 9,373,213 B1 * | 6/2016 | Archer | A63F 13/42 | |
| 9,403,087 B2 * | 8/2016 | Riley | G06F 16/444 | |
| 9,443,192 B1 * | 9/2016 | Cosic | G06N 5/048 | |
| 9,508,224 B2 * | 11/2016 | Russell | H04L 63/123 | |
| 9,530,281 B2 * | 12/2016 | Basallo | A63F 13/837 | |
| 9,600,978 B2 * | 3/2017 | Acres | G07F 17/3244 | |
| 9,619,941 B2 * | 4/2017 | Ueno | G02B 27/02 | |
| 9,682,311 B2 * | 6/2017 | Gilliland | G07F 17/3267 | |
| 9,713,770 B2 * | 7/2017 | Almog | A63F 13/795 | |
| 9,717,984 B1 * | 8/2017 | Barki | A63F 13/822 | |
| 9,757,645 B2 * | 9/2017 | Seo | G06F 21/36 | |
| 9,757,646 B2 * | 9/2017 | Dumitrescu | G06F 3/0486 | |
| 9,808,715 B2 * | 11/2017 | Searchfield | A63F 9/24 | |
| 9,919,224 B2 * | 3/2018 | Mott | A63F 13/822 | |
| 9,968,850 B2 * | 5/2018 | Koster | A63F 13/57 | |
| 10,086,270 B2 * | 10/2018 | Fujita | A63F 13/42 | |
| 10,179,288 B2 * | 1/2019 | Maietti | A63F 13/31 | |
| 10,192,173 B2 * | 1/2019 | Stephens | G06N 5/04 | |
| 10,300,367 B1 * | 5/2019 | Douglas, Jr. | A63F 3/00261 | |
| 10,328,348 B2 * | 6/2019 | Hisaoka | A63F 13/77 | |
| 10,384,136 B2 * | 8/2019 | Chae | G06F 16/244 | |
| 10,434,415 B1 * | 10/2019 | Barki | A63F 13/847 | |
| 10,463,951 B1 * | 11/2019 | Su | A63F 9/0073 | |
| 10,537,789 B2 * | 1/2020 | Park | A63F 13/35 | |
| 10,549,190 B2 * | 2/2020 | Kamobayashi | A63F 13/45 | |
| 10,581,592 B2 * | 3/2020 | Bisti | H04L 9/3297 | |
| 10,675,531 B2 * | 6/2020 | Gustafsson | A63F 13/60 | |
| 10,758,826 B2 * | 9/2020 | Sefcik | A63F 13/60 | |
| 10,835,824 B2 * | 11/2020 | Laker | A63F 13/69 | |
| 10,835,827 B1 * | 11/2020 | Pather | A63F 13/87 | |
| 10,835,828 B1 * | 11/2020 | Pather | A63F 13/213 | |
| D903,778 S * | 12/2020 | Nevgi | A63F 9/1208 | D21/479 |
| 10,874,951 B2 * | 12/2020 | Vaccari | H04L 67/53 | |
| 10,918,937 B2 * | 2/2021 | Nelson, Jr. | A63F 13/335 | |
| 10,918,938 B2 * | 2/2021 | Karlsson | A63F 13/355 | |
| 10,933,327 B2 * | 3/2021 | Karlsson | A63F 13/35 | |
| 10,967,277 B2 * | 4/2021 | Patel | A63F 13/795 | |
| 11,000,758 B2 * | 5/2021 | Kim | A63F 9/0612 | |

(56) References Cited

U.S. PATENT DOCUMENTS

| | | | |
|---|---|---|---|
| 11,062,569 B2* | 7/2021 | Paradise | A63F 13/798 |
| 11,110,353 B2* | 9/2021 | Somers | A63F 13/67 |
| 11,154,786 B2* | 10/2021 | Yoo | A63F 13/35 |
| 11,413,534 B2 | 8/2022 | Inaba | |
| 2003/0111792 A1* | 6/2003 | Yu | A63F 3/00075 |
| | | | 273/273 |
| 2004/0017042 A1* | 1/2004 | Piernas | A63F 9/20 |
| | | | 273/296 |
| 2005/0124401 A1* | 6/2005 | Izuno | A63F 13/92 |
| | | | 463/7 |
| 2005/0230911 A1* | 10/2005 | Blake | A63F 3/02 |
| | | | 273/285 |
| 2006/0094502 A1* | 5/2006 | Katayama | A63F 13/2145 |
| | | | 463/31 |
| 2006/0178213 A1* | 8/2006 | Ohta | A63F 13/57 |
| | | | 463/37 |
| 2007/0018394 A1* | 1/2007 | Montaldo | A63F 1/04 |
| | | | 273/273 |
| 2007/0228655 A1* | 10/2007 | Teeple | A63F 1/00 |
| | | | 273/292 |
| 2008/0084028 A1* | 4/2008 | Okos | A63F 3/00072 |
| | | | 273/257 |
| 2008/0252012 A1* | 10/2008 | Montz | A63F 3/00145 |
| | | | 273/292 |
| 2009/0076784 A1* | 3/2009 | Ong | A63F 13/332 |
| | | | 706/62 |
| 2009/0166972 A1* | 7/2009 | Douglas | A63F 3/0415 |
| | | | 273/236 |
| 2009/0309304 A1* | 12/2009 | Miguel | A63F 3/02 |
| | | | 273/272 |
| 2010/0160030 A1* | 6/2010 | Indrakumar | G07F 17/3258 |
| | | | 463/20 |
| 2011/0031693 A1* | 2/2011 | Dvorak | A63F 9/20 |
| | | | 273/273 |
| 2011/0189644 A1* | 8/2011 | Milne | A63F 9/18 |
| | | | 434/327 |
| 2012/0147714 A1* | 6/2012 | Chaut | G04G 9/0088 |
| | | | 368/242 |
| 2012/0306775 A1* | 12/2012 | Miyachi | A63F 13/2145 |
| | | | 345/173 |
| 2013/0090162 A1* | 4/2013 | Shellhamer | A63F 13/80 |
| | | | 463/31 |
| 2013/0172061 A1* | 7/2013 | Iosilevsky | A63F 13/80 |
| | | | 463/9 |
| 2013/0210520 A1* | 8/2013 | Yonezu | A63F 13/00 |
| | | | 463/31 |
| 2013/0234388 A1* | 9/2013 | Dale | A63F 9/10 |
| | | | 273/156 |
| 2014/0128163 A1* | 5/2014 | Almog | A63F 13/30 |
| | | | 463/42 |
| 2014/0171166 A1* | 6/2014 | Merari | A63F 13/55 |
| | | | 463/9 |
| 2014/0235338 A1* | 8/2014 | Hansson | A63F 13/533 |
| | | | 463/31 |
| 2014/0361487 A1* | 12/2014 | Hu | A63F 9/20 |
| | | | 273/292 |
| 2014/0364210 A1* | 12/2014 | Murray | G07F 17/3272 |
| | | | 463/31 |
| 2014/0370950 A1* | 12/2014 | Hansson | A63F 13/00 |
| | | | 463/9 |
| 2015/0038223 A1* | 2/2015 | Watabe | A63F 13/57 |
| | | | 463/31 |
| 2015/0174488 A1* | 6/2015 | Dancau | A63F 13/57 |
| | | | 463/9 |
| 2015/0265910 A1* | 9/2015 | Campbell | A63F 13/30 |
| | | | 463/10 |
| 2015/0265923 A1* | 9/2015 | Campbell | A63F 13/537 |
| | | | 463/31 |
| 2015/0265924 A1* | 9/2015 | Campbell | A63F 13/537 |
| | | | 463/31 |
| 2015/0290545 A1* | 10/2015 | Barney | A63F 13/21 |
| | | | 463/31 |
| 2015/0375098 A1* | 12/2015 | Horovitz | A63F 3/00643 |
| | | | 463/11 |
| 2016/0067608 A1* | 3/2016 | Yim | A63F 13/53 |
| | | | 463/31 |
| 2016/0089602 A1* | 3/2016 | Frostberg | A63F 9/0612 |
| | | | 463/31 |
| 2016/0089603 A1* | 3/2016 | Frostberg | A63F 13/80 |
| | | | 463/31 |
| 2016/0214009 A1* | 7/2016 | Almog | A63F 13/30 |
| 2016/0220897 A1* | 8/2016 | Hansson | A63F 13/25 |
| 2016/0220898 A1* | 8/2016 | Nyblom | A63F 13/35 |
| 2016/0243436 A1* | 8/2016 | Minor | A63F 9/20 |
| 2017/0056761 A1* | 3/2017 | Willman | A63F 13/52 |
| 2017/0087449 A1* | 3/2017 | McCoy | A63F 9/20 |
| 2017/0282053 A1* | 10/2017 | Malis | A63F 3/0052 |
| 2017/0296932 A1* | 10/2017 | Kushner | A63F 13/332 |
| 2018/0154248 A1* | 6/2018 | Duprey | A63F 11/0074 |
| 2019/0176024 A1* | 6/2019 | Hansson | A63F 13/2145 |
| 2020/0193777 A1* | 6/2020 | Moret, Jr. | A63F 9/20 |
| 2021/0187395 A1* | 6/2021 | Inaba | A63F 13/57 |
| 2022/0203218 A1* | 6/2022 | Dym | A63F 9/0641 |
| 2022/0379195 A1* | 12/2022 | Junkka | A63F 9/0612 |
| 2022/0401839 A1* | 12/2022 | Heijkens | A63F 13/55 |
| 2023/0210520 A1 | 7/2023 | Dale et al. | |

* cited by examiner

ALTERING COMPUTER GAME TILES HAVING MULTIPLE MATCHABLE ENDS

FIELD AND BACKGROUND OF THE INVENTION

The present invention, in some embodiments thereof, relates to altering a display of a computer game and, more specifically, but not exclusively, to altering a display of a computer game to remove matching separable ends of selectable objects in response to user input indicating of correct matches.

Computer games may be highly attractive as they may offer players multiple rewards such as, for example, fun, and challenge, to name just a few.

Computer gaming has therefore long become a major field of interest for a constantly growing number of users who may spend a significant portion of their time playing such computer games. This trend is constantly expanding in scale and scope due to the rapid and ever growing accessibility of users to client devices, for example, computers, Smartphones, tablets and/or the like which may be used for playing the computer games.

SUMMARY OF THE INVENTION

According to a first aspect of the present invention there is provided a method of altering display of selectable objects having multiple matchable ends in a computer game, comprising using one or more processors for:
  Displaying a plurality of selectable objects of a computer game displayed by a client device. Each of the plurality of selectable objects initially has a plurality of separable ends. Each of the plurality of separable ends of each of the plurality of selectable objects is marked with one of a plurality of patterns.
  Receiving user input comprising a match indication of one or more matches between separable ends of at least two of the plurality of selectable objects marked with a common pattern of the plurality of patterns.
  Altering the display of one or more of the at least two selectable objects by breaking away and removing the matched separable end of the one or more selectable objects in case the one or more matches indicated by the match indication are correct.

According to a second aspect of the present invention there is provided a system for altering display of selectable objects having multiple matchable ends in a computer game, comprising a memory for storing program code, and one or more processors coupled to the memory. the one or more processors are configured to execute the program code. The program code comprising:
  Code instructions to display a plurality of selectable objects of a computer game displayed by a client device. Each of the plurality of selectable objects initially has a plurality of separable ends. Each of the plurality of separable ends of each of the plurality of selectable objects is marked with one of a plurality of patterns.
  Code instructions to receive user input comprising a match indication of one or more matches between separable ends of at least two of the plurality of selectable objects marked with a common pattern of the plurality of patterns.
  Code instructions to alter the display of one or more of the at least two selectable objects by breaking away and removing the matched separable end of the one or more selectable objects in case the one or more matches indicated by the match indication are correct.

According to a third aspect of the present invention there is provided a method of limiting match options for selectable objects having multiple matchable ends in a computer game, comprising using one or more processors for:
  Displaying a plurality of selectable objects of a computer game displayed by a client device. Each of the plurality of selectable objects initially has a plurality of separable ends. Each of the plurality of separable ends of each of the plurality of selectable objects is marked with one of a plurality of patterns.
  Altering the display of one or more of the plurality of selectable objects by associating a lock mark with one or more separable ends of one or more of the plurality of selectable objects. The lock mark indicating that the associated one or more separable ends are prohibited for matching with one or more separable ends of at least another one of the plurality of selectable objects.

According to a fourth aspect of the present invention there is provided a system for limiting match options for selectable objects having multiple matchable ends in a computer game, comprising a memory for storing program code, and one or more processors coupled to the memory. The one or more processors are configured to execute the program code. The program code comprising:
  Code instructions to display a plurality of selectable objects of a computer game displayed by a client device, each of the plurality of selectable objects initially has a plurality of separable ends, each of the plurality of separable ends of each of the plurality of selectable objects is marked with one of a plurality of patterns.
  Code instructions to alter the display of one or more of the plurality of selectable objects by associating a lock mark with one or more separable ends of one or more of the plurality of selectable objects. The lock mark indicating that the associated one or more separable ends are prohibited for matching with one or more separable ends of at least another one of the plurality of selectable objects.

In a further implementation form of the first, second, third and/or fourth aspects, the plurality of selectable objects are tiles having two separable ends each marked with a receptive on of the plurality of patterns.

In a further implementation form of the first, second, third and/or fourth aspects, the plurality of selectable objects are arranged in a plurality of stacks. Each of the plurality of stacks initially comprises at least two selectable objects stacked such that each separable end of a higher layer of the respective stack conceals a corresponding separable end of each lower layer selectable object of the respective stack. Wherein after one or more separable ends of the top selectable object is broken away, a respective separable end of the lower layer selectable object is revealed and made available for matching.

In a further implementation form of the first, second, third and/or fourth aspects, following a successful match of a final separable end of a bottom most selectable object of one or more of the plurality of stacks such that the one or more stacks are empty, the display is altered to remove the empty stack.

In an optional implementation form of the first, second, third and/or fourth aspects, each of the plurality of stacks is fixed on a respective tray. Wherein the display is altered to remove the tray of each stack that is empty following a successful match of a final separable end of a bottom most selectable object of the respective stack.

In an optional implementation form of the first, second, third and/or fourth aspects, the display is altered to present one or more new stacks of selectable objects which appears following the removal of the empty stack.

In an optional implementation form of the first, second, third and/or fourth aspects, the one or more new stacks appear in the display to form a new level in the computer game.

In a further implementation form of the third and/or fourth aspects, the lock mark is configured to conceal the pattern marked on the one or more separable ends of the one or more selectable objects.

In a further implementation form of the third and/or fourth aspects, the lock mark is configured such that the pattern marked on the one or more separable ends of the one or more selectable objects are visible.

In an optional implementation form of the third and/or fourth aspects, the display is periodically altered to select one or more separable ends of one or more of the plurality of selectable objects and associate the at least selected separable end with a lock mark.

In a further implementation form of the third and/or fourth aspects, the display is periodically altered to switch between separable ends of the one or more selectable objects and associate at least another one separable end of the one or more selectable objects with the lock mark.

In a further implementation form of the third and/or fourth aspects, the display is altered to switch between the separable ends of the one or more selectable objects after every user move.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
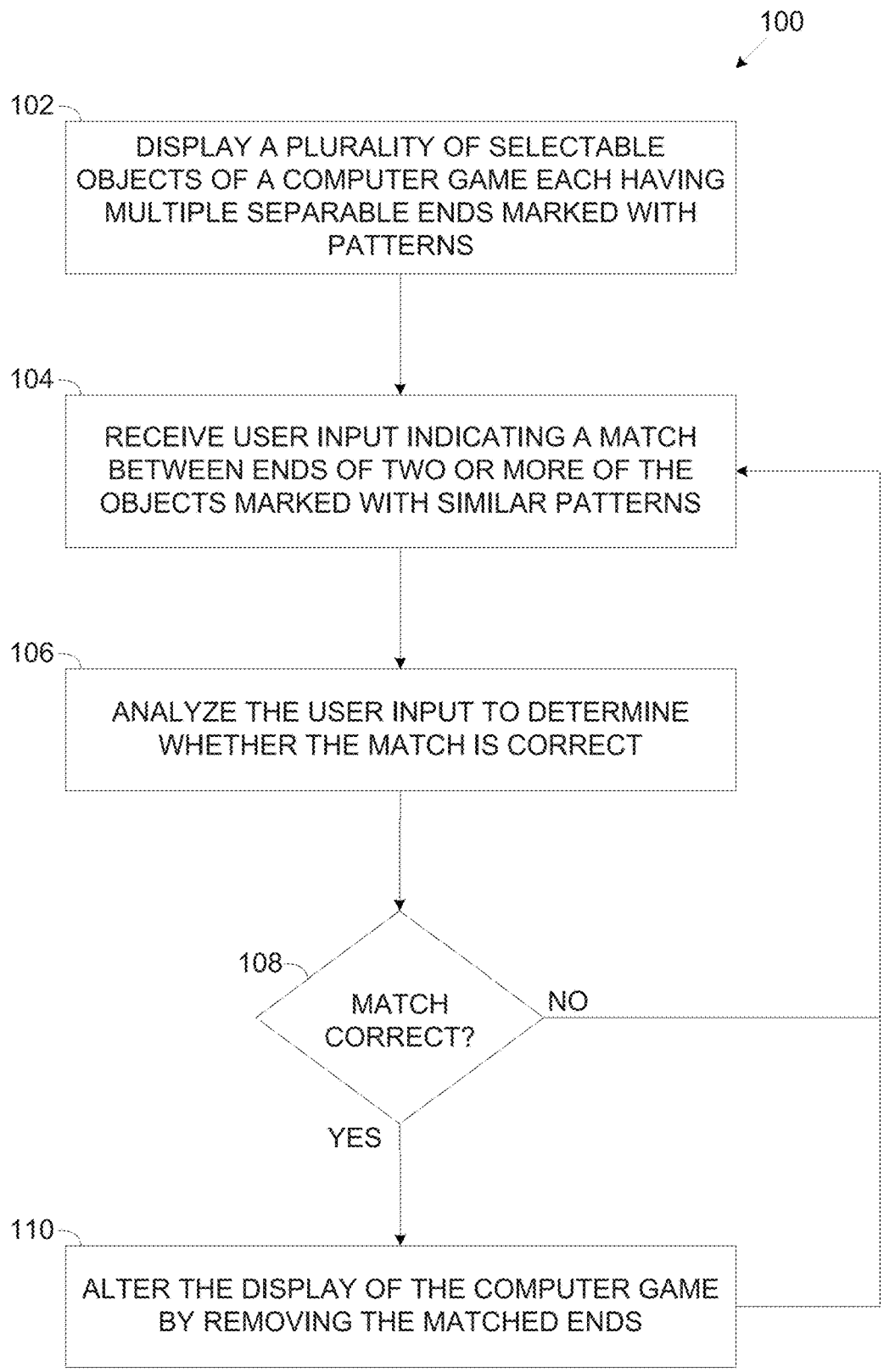
FIG. 1 is a flowchart of an exemplary process of altering a display of a computer game to remove matching separable ends of selectable objects, according to some embodiments of the present invention.

The present invention, in some embodiments thereof, relates to altering a display of a computer game and, more specifically, but not exclusively, to altering a display of a computer game to remove matching separable ends of selectable objects in response to user input indicating of correct matches.

According to some embodiments of the present invention, there are provided methods, systems and computer program products for altering a display of a computer game, in particular a matching computer game.

A plurality of selectable objects, items and/or assets (collectively designated objects) of the computer game, for example, a tile (e.g., domino tile), a card, and/or the like may each have a plurality of separable ends which may be detached and removed from the respective selectable object. Each of the separable ends may be marked with one of a plurality of patterns.

Users playing (players) the matching game using client devices (e.g. computers, tablets, Smartphones, etc.) are challenged to match between separable ends having similar and/or identical patterns. When the player indicates a correct match between similar patterns marked on the separable ends of two or more selectable objects, the display of the computer game may be altered to separate the matched separable ends, break them away from their (parent) selectable objects and remove them.

Moreover, the selectable objects of the computer game may be stacked in a plurality of stacks each comprising multiple selectable objects stacked one on top the other such that only the patterns marked on the separable ends of a top most selectable object in each stack may be visible while the top most selectable object conceals the patterns marked on the separable ends of lower layer selectable objects of the stack such that these patterns are invisible to the player.

As such, the player may match between visible patterns which are marked on the separable ends of the top most selectable objects in the stacks. However, when the display is altered to remove correctly matched separable ends which are obviously those of the top most selectable objects, the next lower layer selectable objects become the top most selectable objects and the pattern marked on their separable ends be revealed and visible to the player who may now select the newly revealed separate ends for matching.

Altering the display of the computer game to remove correctly matched separable ends may present significant benefits and advantages.

Even computer games which are initially highly attractive to players as they offer substantial fun and/or challenge, the appeal of a computer game may gradually diminish as players become familiar with its features, elements, details and/or the like which may eventually lead to loss of interest of the players in the computer game.

Therefore, altering the display of the computer game to remove correctly matched separable ends may significantly improve the technology of computer games by providing a dynamic game scene which may add challenge to the computer game thus increasing interest, attraction, and/or enthusiasm of the player in the computer game which may also increase player retention.

Furthermore, altering the display of the computer game to remove the correctly matched separable ends may further improve the technology of computer games since the display may be altered to remove the matched separable ends in a very graceful and appealing manner which may significantly improve user experience of the player.

Arranging the selectable objects in stacks such that removal of correctly matched separable ends of the top most selectable objects in each stack reveals the patterns marked on the next lower layer selectable objects of the stack may make the computer game even more dynamic and challenging which in turn may further increase interest, attraction, and/or enthusiasm of the player in the computer game.

According to some embodiments of the present invention the display of the computer game may be altered to lock one or more of the separable ends of one or more of the selectable objects thus prohibiting the locked separable ends for matching and limiting the matching options for the player.

To this end, the display may be altered to associate one or more selected separable ends of one or more selected selectable objects of the computer game with a lock mark which prevents the user from selecting these separable ends for matching with separable ends of other selectable objects marked with similar and/or identical patterns.

Moreover, the display may be periodically altered, for example, every time period, every number of moves (turns) of the player and/or the like, to reselect separable ends of the same and/or other selectable objects that are associated with lock marks and thus prohibited for matching.

The lock marks associated with the locked separable ends may be transparent such that the pattern of the locked separable ends may be visible to the player. However, the lock marks may be configured to conceal the pattern of the locked separable ends such that they are not visible to the player.

Altering the display of the computer game to lock one or more of the separable ends and thus prevent the user from matching them may significantly improve the technology of computer games by providing a dynamic lock feature which may significantly increase the challenge offered by the computer game thus increasing interest, attraction, and/or enthusiasm of the player in the computer game which may also increase player retention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of altering a display of a computer game to remove matching separable ends of selectable objects, according to some embodiments of the present invention.

An exemplary process 100 may be executed to alter a display of a computer game displayed by a client device which displays, to a user associated with the client device, a plurality of selectable objects (items), for example, a tile (e.g., domino tile), a card, and/or the like each having a plurality of separable ends which may be detached and removed from the respective selectable object.

Each of the separable ends of each of the selectable objects may be marked with one of a plurality of patterns such that the user may interact with the client device to indicate matches between separable ends of different selectable objects having similar patterns.

In response to user input indicating one or more such matches, the display may be altered to remove the matched separable ends in case the match is correct. In particular, the display may be altered to break away the matched separable ends from their respective selectable objects.

Figure 2:
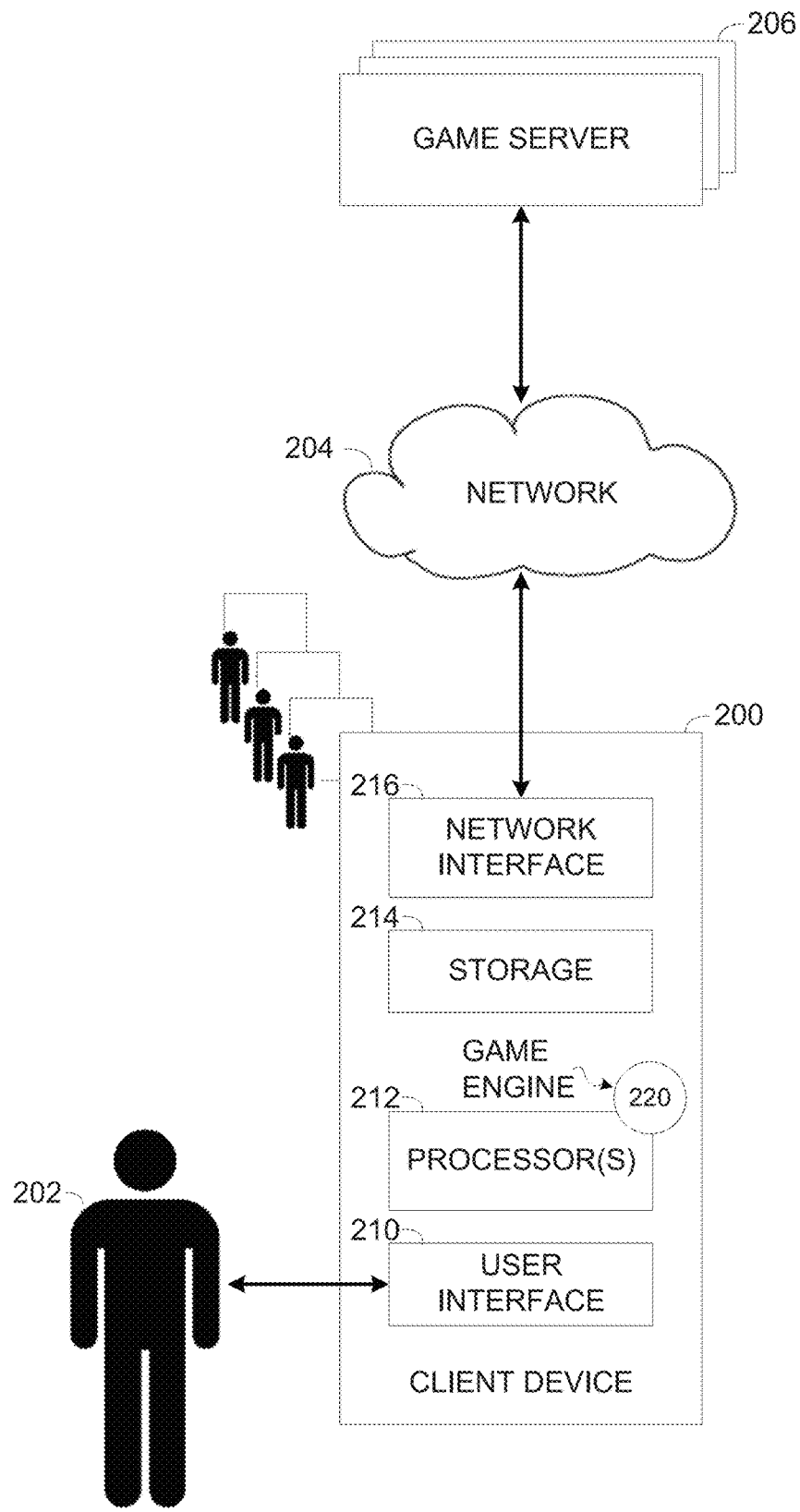
FIG. 2 is a schematic illustration of an exemplary client device configured for altering a display of a computer game, according to some embodiments of the present invention.

Reference is also made to FIG. 2, which is a schematic illustration of an exemplary client device configured for altering a display of a computer game, according to some embodiments of the present invention.

One or more exemplary client devices 200, for example, a server, a desktop computer, a laptop computer, a Smartphone, a tablet, a proprietary client device and/or the like may be used by one or more associated users 202 to play one or more computer games.

Each client device 200 may comprise a user interface 210 for interacting with the associated user 202, a processor(s) 212, and a storage 214 for storing data and/or code (program store).

The user interface 210 may include one or more Human-Machine Interfaces (HMI) for interacting with the user 202, for example, a keyboard, a pointing device (e.g., a mouse, a touchpad, a trackball, etc.), a screen, a touchscreen, a digital pen, a speaker, an earphone, a microphone and/or the like. The user may therefore operate one or more of the HMI interface of the user interface 210 to interact with the client device 200, for example, play one or more of the computer games.

The processor(s) 212, homogenous or heterogeneous, may include one or more processing nodes and/or cores arranged for parallel processing, as clusters and/or as one or more multi core processor(s). The storage 214 may include one or more non-transitory persistent storage devices, for example, a Read Only Memory (ROM), a Flash array, a Solid State Drive (SSD), a hard drive (HDD) and/or the like. The storage 214 may also include one or more volatile devices, for example, a Random Access Memory (RAM) component, a cache and/or the like.

The processor(s) 212 may execute one or more software modules such as, for example, a process, a script, an application, an agent, a utility, a tool and/or the like each comprising a plurality of program instructions stored in a non-transitory medium (program store) such as the storage 232 and executed by one or more processors such as the processor(s) 230. Optionally, the processor(s) 230 may include one or more hardware elements integrated in the client device 200 to support one or more of the software modules executed by the client device 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212.

Optionally, the processor(s) 212 includes, utilizes and/or applies one or more hardware elements available in the client device 200, for example, a circuit, a component, an Integrated Circuit (IC), a Field Programmable Gate Array (FPGA), an Application Specific Integrated Circuit (ASIC), a Digital Signals Processor (DSP), a Graphic Processing Unit (GPU), and/or the like.

The processor(s) 212 may therefore execute one or more functional modules utilized by one or more software modules, one or more of the hardware elements and/or a combination thereof. For example, the processor(s) 212 may execute a game engine 220 configured to execute the process 100 and/or part thereof for altering a display of a computer game to remove separable ends of selectable objects in response to correct match indications received from the user 202.

Optionally, one or more of the client devices 200 may further include a network interface 216 comprising one or more network adapters for connecting to a network 204 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

Via the network interface 202, the client device 200 may connect to the network 204 and communicate with one or more remote network resources, such as, for example, one or more game servers, computing nodes, clusters of computing nodes, platforms, systems, services, and/or the like collectively designated game server 206 that is configured to provide gaming services to one or more of the client devices 202.

Optionally, the game server 206 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

The game engine 220 executed by each of the client devices 200 may be therefore configured to execute the process 100 and/or part thereof depending on the deployment, architecture and/or implementations of the games played by the users 202 using their client devices 200, specifically in terms of execution of the game at the client device 200 and/or at the remote game server 206.

For example, the game engine 220 locally executed by the client device 200 may execute one or more stand-alone games such that the game logic, engine, and/or the like as well as the graphical and/or user interfaces are all controlled by the local game engine 220. The local game engine 220 may optionally communicate with one or more remote network resources, for example, the game server 206 to receive, retrieve, collect and/or otherwise obtain supplemental data relating to the game(s) which may be used to enrich the game but is not essential to the execution of the game.

In another example, the client device 200 may communicate with the game server 206 which may execute the core, logic, engine, and/or the like of one or more games, for example, a web game, and/or the like. While the game engine itself may be executed remotely by the game server 206, the game server 206 may instruct the client device 200 to control its graphical and/or user interfaces accordingly. In such implementations, the game engine 220 executed locally by the client device 200, for example, a web browser, a mobile application, and/or the like may serve only as a local agent adapted to support interaction with the user 202 playing the game(s) (e.g., display, play sound, receive input, etc.) while the game itself is remotely executed by the game server 206.

In another example, execution of one or more games may be distributed between the client device 200 and the remote game server 206 such that each may execute part of the of the game(s). The graphical and/or user interfaces of the client device 200 however, may be naturally controlled by the local game engine 220.

For brevity, regardless of the exact deployment, architecture and/or implementation of the games, the game engine 220 is described herein after to control the entire game including its engine, logic, plot as well as the graphical and/or user interfaces. This however, should not be construed as limiting since as may become apparent to a person skilled in the art, the previously described deployment embodiments as well as other deployments may be applied to serve the game to the users 202.

Moreover, while the process 100 is described for a single game played by a single user 202 using a respective client device, it should not be construed as limiting since the same process may be expanded and scaled for a plurality of user 202 using a plurality of client devices 200 to play a plurality of games.

As shown at 102, the process 100 starts with the game engine 220 presenting a game to a user 202 via the user interface 210 of the client device 200. In particular, the game engine 220 may display objects, items and/or assets of the game by instructing, operating, altering and/or otherwise controlling one or more screens of the client device 200.

Moreover, the user 202 may play the game by interacting with the game engine 220 via one or more input interfaces supported by the user interface 210 of the client device 200. For example, the user 202 may operate a pointing device, a keyboard and/or the like of the client device 200 to select, for example, click, point, choose, adjust, write, and/or the like one or more of the game's objects, items and/or assets which are thus collectively designated selectable objects.

The game may be a matching game, for example, a domino game, a memory game, and/or the like in which each of the plurality of selectable objects has a plurality of ends, for example, 2 ends, 3 ends, 4, ends, and/or the like each marked with one of a plurality of patterns where the user 202 has to match between object ends marked with similar and/or identical patterns.

In particular, each of the plurality of selectable objects may initially have a plurality of separable ends, i.e., sections, segments and/or parts of the object which may be separated, broken away and removed from the object.

Figure 3A:
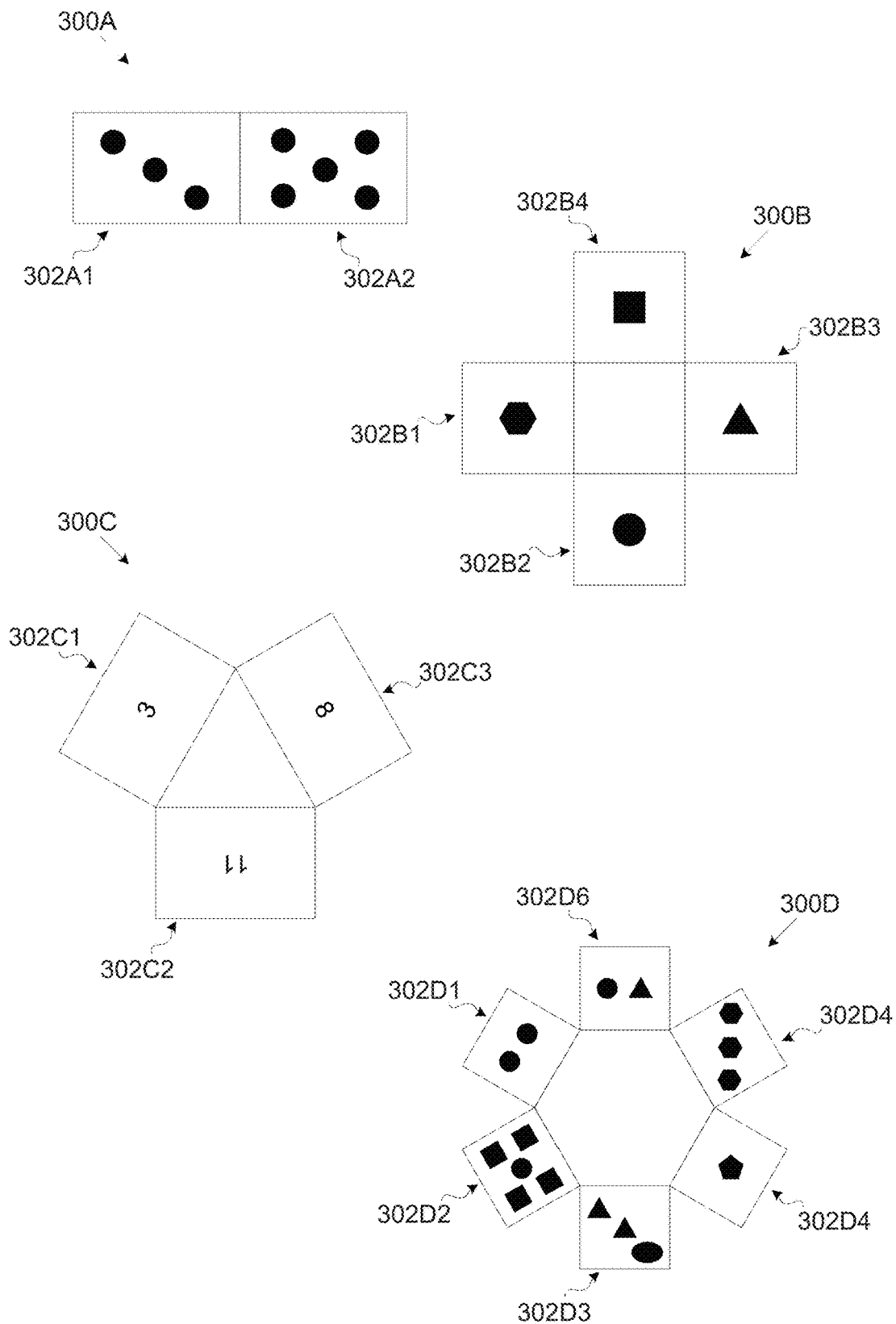
FIG. 3A and FIG. 3B are schematic illustrations of exemplary selectable objects of a computer game having multiple separable ends, according to some embodiments of the present invention.
Figure 3B:
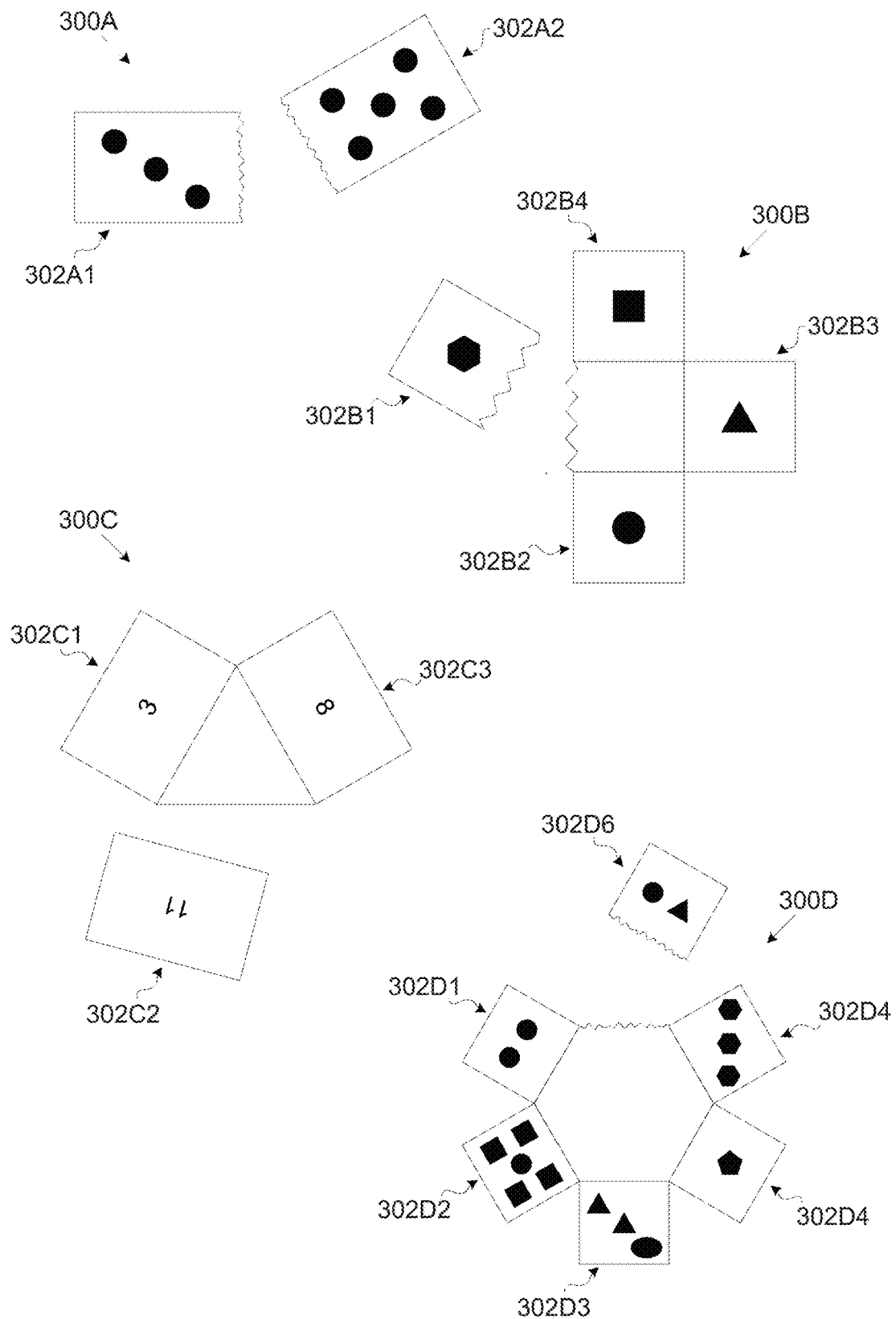

Reference is now made to FIG. 3A and FIG. 3B, which are schematic illustrations of exemplary selectable objects of a computer game having multiple separable ends, according to some embodiments of the present invention.

As seen in FIG. 3A, a plurality of exemplary selectable objects 300 of a game may comprise a plurality of separable ends 302 each marked with one of a plurality of patterns. The number of separable ends 302 and the number, type and/or style of the patterns marked on the separable ends 302 may be defined, selected and/or set according to one or more goals, objectives, parameters, levels and/or the like of the game. The patterns may be marked on the selectable objects using one or more methods, techniques and/or technologies, for example, painted, printed, imprinted, engraved, embossed, debossed and/or the like.

Moreover, the patterns may also include blank spaces, i.e., no marking on one or more of the separable ends 302 of one or more of the selectable objects 300.

For example, an exemplary selectable object 300A may be configured as a tile, for example, a domino tile having two separable ends each marked with one of a plurality of patterns, for example, 6 patterns illustrating one dot, two dots, three dots, four dots, five dots, and six dots. For example, a first separable end 302A1 of the selectable object 300A may be marked with a three dots pattern and a second separable end 302A2 of the selectable object 300A may be marked with a five dots pattern.

In another example, an exemplary selectable object 300B may be configured as a cross having four separable ends each marked with one of a plurality of patterns, for example, geometric shapes. For example, a first separable end 302B1 of the selectable object 300B may be marked with a hexagon shape, a second separable end 302B2 of the selectable object 300B may be marked with a circle shape, a third separable end 302B3 of the selectable object 300B may be marked with a triangle shape, and a fourth separable end 302B4 of the selectable object 300B may be marked with a square shape.

In another example, an exemplary selectable object 300C may be configured to have three separable ends each marked with one of a plurality of patterns, for example, numbers. For example, a first separable end 302C1 of the selectable object 300C may be marked with the number 3, a second separable end 302C2 of the selectable object 300C may be marked with the number 11, and a third separable end 302C3 of the selectable object 300C may be marked with the number 8.

In another example, an exemplary selectable object 300D may be configured to have six separable ends each marked with one of a plurality of patterns, for example, combinations of one or more geometric shapes. For example, a first separable end 302D1 of the selectable object 300D may be marked with two circles, a second separable end 302D2 of the selectable object 300D may be marked with four peripheral squares and a circle in the middle, a third separable end 302D3 of the selectable object 300D may be marked with the two triangles and an ellipse, a fourth separable end 302D4 of the selectable object 300D may be marked with a pentagon, a fifth separable end 302D5 of the selectable object 300D may be marked with three hexagons, and a sixth separable end 302D6 of the selectable object 300D may be marked with a circle and a triangle.

As seen in FIG. 3B, a display of the game, specifically a display (image) of the selectable objects 300 may be altered such that each of the separable ends 302 of each of the exemplary selectable objects 300 may be separated, i.e., broken away and removed from its selectable object 300. For example, the separable end 302A2 may be separated from the selectable object 300A. In another example, the separable end 302B1 may be separated from the selectable object 300B. In another example, the separable end 302C2 may be separated from the selectable object 300C. In another example, the separable end 302D6 may be separated from the selectable object 300D.

Moreover, the display (image) of the selectable objects 300 may be altered to display a separation line, a break line, and/or the like marking the separation of one or more of the separated and removed separable ends 302. For example, as seen in FIG. 3B for selectable objects 300A, 300B and 300D, a zigzag line, a crooked line, a jagged line, and/or the like may be marked to indicate that separable ends 302 were separated and removed from the selectable objects 300.

Reference is made once again to FIG. 1.

As shown at 104, the game engine 220 may receive user input, from the user operating the user interface 210, comprising a match indication of one or more matches between separable ends 302 of two or more of the plurality of selectable objects 300 marked with similar and/or identical patterns.

Specifically, the match indication received from the user 202 may indicate of one or more matches made by the user 202 playing the game between the separable ends 302 of the two or more of the plurality of selectable objects 300 which the user 202 determines, estimates, guesses, thinks and/or believes are marked with common patterns of the plurality of patterns employed in the game.

As shown at 106, the game engine 220 may analyze the match indication extracted from the user input to check whether the match indicated by the user 202 is correct or not.

Specifically, the game engine 220 may identify a state of the plurality of selectable objects 300 of the computer game displayed by the client device 200 and may analyze the patterns marked on the separable ends 302 of the selectable objects 300 indicated by the user 202 as matching to determine whether the patterns marked on the indicated separable ends 302 are indeed similar and/or identical or not.

As shown at 108, which is a conditional step, in case the game engine 220 determines that the match indication made by the user 202 is correct, the process 100 may branch to 110. In case the game engine 220 determines that the match indication made by the user 202 is incorrect, the process 100 may end or optionally return to step 104 to receive additional user input from the user 202.

As shown at 110, since the match indication made by the user 202 is correct, the game engine may alter the display of the game, specifically the display of the selectable objects 300 indicated by the user 202 to have matching separable ends 302 by separating, breaking away and removing the matched separable ends 302.

Following the display alteration, the game engine 220 may optionally branch back to step 104 to receive additional user input from the user 202.

Figure 4A:
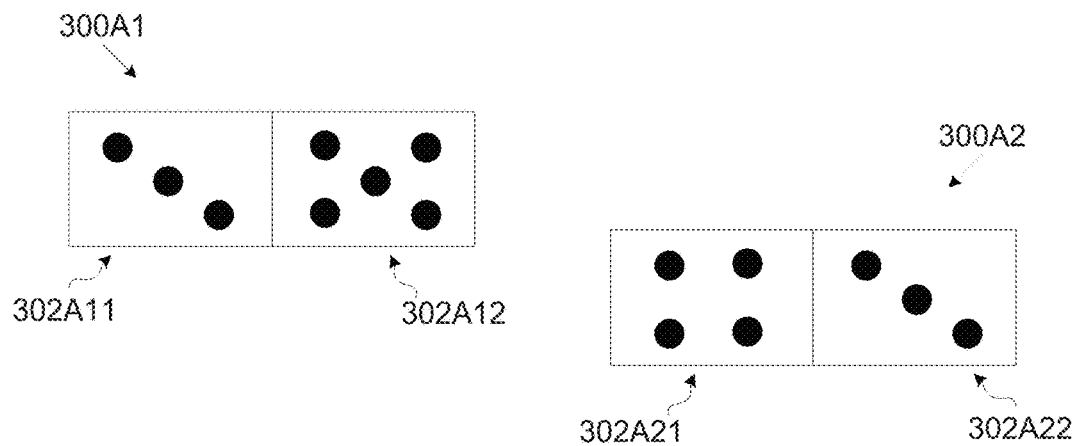
FIG. 4A, FIG. 4B and FIG. 4C are schematic illustrations of an exemplary display of a computer game altered according to an exemplary match between separable ends of selectable objects, according to some embodiments of the present invention.
Figure 4B:
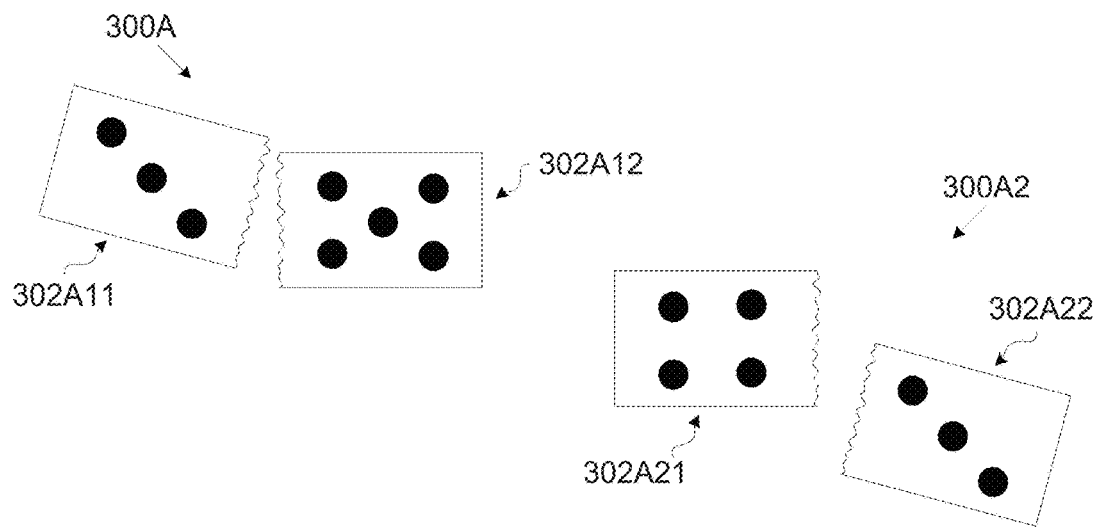
Figure 4C:
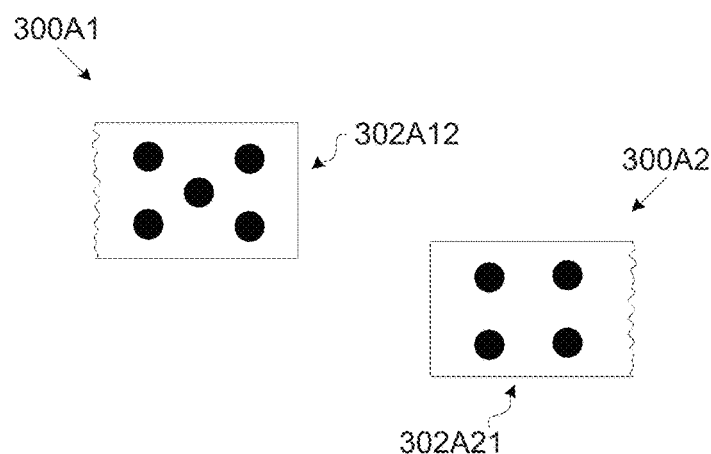

Reference is no made to FIG. 4A, FIG. 4B and FIG. 4C, which are schematic illustrations of an exemplary display of a computer game altered according to an exemplary match between separable ends of selectable objects, according to some embodiments of the present invention.

As seen in FIG. 4A, a game engine such as the game engine 220 may display a plurality of selectable objects such as the selectable objects 300 of a game, for example, a domino like game played by a user such as the user 202 as described in step 102 of the process 100. The displayed selectable objects 300, for example, domino tiles may each have multiple separable ends such as the separable ends 302, for example, two separable ends 302 each marked with one of a plurality of patterns, for example, domino dot patterns.

For example, the game engine 220 may display a first selectable object 300A1 and a second selectable object 300A2. The first selectable object 300A1 may have two separable ends, a first separable end 302A11 marked with a three dots patterns and a second separable end 302A12 marked with a five dots pattern. The second selectable object 300A1 may also have two separable ends, a first separable end 302A21 marked with a four dots patterns and a second separable end 302A22 marked with a three dots pattern.

Assuming the game engine 220 receives user input from the user 202, as described in step 104 of the process 100, which comprises a match indication of a match between the separable end 302A11 of the selectable object 300A1 and the separable end 302A22 of the selectable object 300A2.

In such case, the game engine 220 may analyze the match indication and determine that the match is correct, as described in steps 106 and 108 of the process 100, since both separable end 302A11 and separable end 302A22 are marked with the same pattern, namely the three dots pattern.

As seen in FIG. 4B, since the match is correct, the game engine 220 may alter the display (image) of the selectable objects 300A1 and 300A2 to separate and break away the matched separable ends 302A11 and 302A22. The game engine 220 may further alter the display game, specifically the display of the selectable objects 300A1 and 300A2 to remove the matched separable ends 302A 11 and 302A22 as seen in FIG. 4C such that the selectable object 300A1 remains with only separable end 302A12 and the selectable object 300A2 remains with only separable end 302A21.

According to some embodiments of the present invention, the plurality of selectable objects 300 are arranged in a plurality of stacks such that each of the stacks may initially comprise multiple selectable objects 300, specifically two or more selectable objects 300 which are stacked (layered) one on top the other.

As they are stacked (layered) on each other a top most selectable object 300 in a stack may conceal the selectable object(s) 300 of lower layer(s) of the stack. In particular, each separable end 302 of a higher layer of the stack may conceal a corresponding separable end 302 of all lower layer(s) of the stack.

Corresponding separable ends 302 refers to separable ends 302 of two or more different selectable objects 300 which are stacked one on top the other such that the position, location, and/or orientation of the corresponding separable ends 302 with respect to their (parent) selectable objects 300 is the same.

Moreover, during the game after the game engine 220 alters the display of a top most selectable object 300 in a stack to remove a matched separable end 302, the corresponding separable end 302 of selectable object 300 in the next lower layer is revealed such that the pattern marked on the corresponding lower layer separable end 302 becomes visible to the user 202.

Revealing patterns marked on separable ends 302 of lower layers' selectable objects 300 may enable additional match options for the user 302 to advance in the game.

Figure 5:
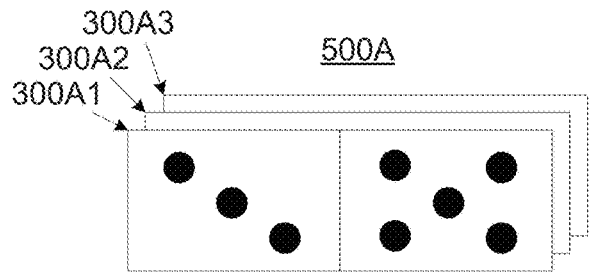
FIG. 5 is a schematic illustrations of stacked selectable objects of a computer game, according to some embodiments of the present invention.
Figure 5:
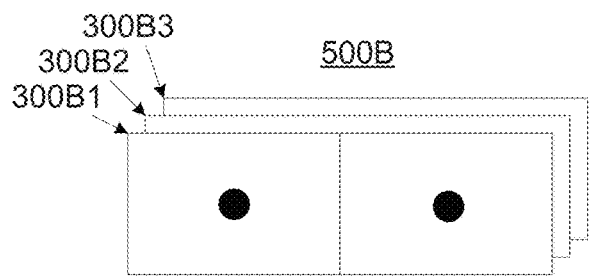
Figure 5:
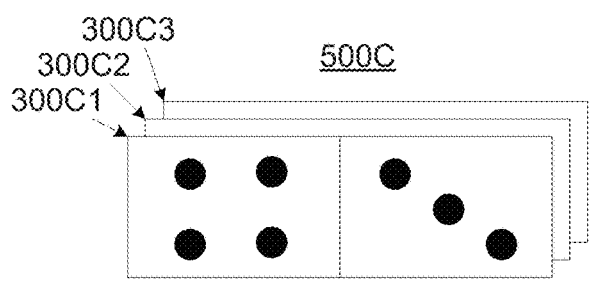
Figure 5:
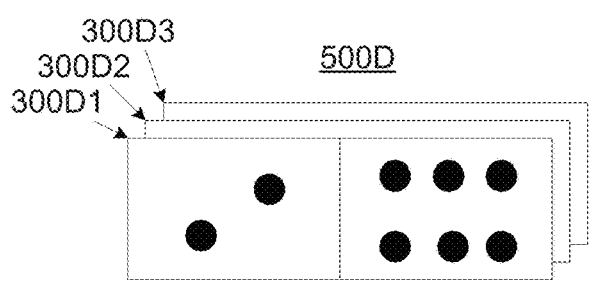

Reference is now made to FIG. 5, which is a schematic illustrations of stacked selectable objects of a computer game, according to some embodiments of the present invention.

A game engine such as the game engine 220 may display a plurality of selectable objects such as the selectable objects 300 arranged in a plurality of stacks 500 each initially comprising multiple selectable objects 300, for example, three selectable objects 300 stacked one on top the other.

For example, a stack 500A may comprise a top layer selectable object 300A1, a middle layer selectable object 300A2 and a bottom layer selectable object 300A3, a stack 500B may comprise a top layer selectable object 300B1, a middle layer selectable object 300B2 and a bottom layer selectable object 300B3, a stack 500C may comprise a top layer selectable object 300C1, a middle layer selectable object 300C2 and a bottom layer selectable object 300C3, and a stack 500D may comprise a top layer selectable object 300D1, a middle layer selectable object 300D2 and a bottom layer selectable object 300D3.

Since the selectable objects 300 are stacked (layered) one on top the other, only the patterns marked on separable ends such as the separable ends 302 of the selectable object 300 at the top most layer may be visible while the patterns marked on the separable ends 302 of selectable objects 300 at lower layers of the stack(s) may be invisible. For example, only the patterns marked on separable ends 302 of the top most selectable objects 300 of each of the stacks 500A, 500B, 500C and 500D may be visible.

Figure 6A:
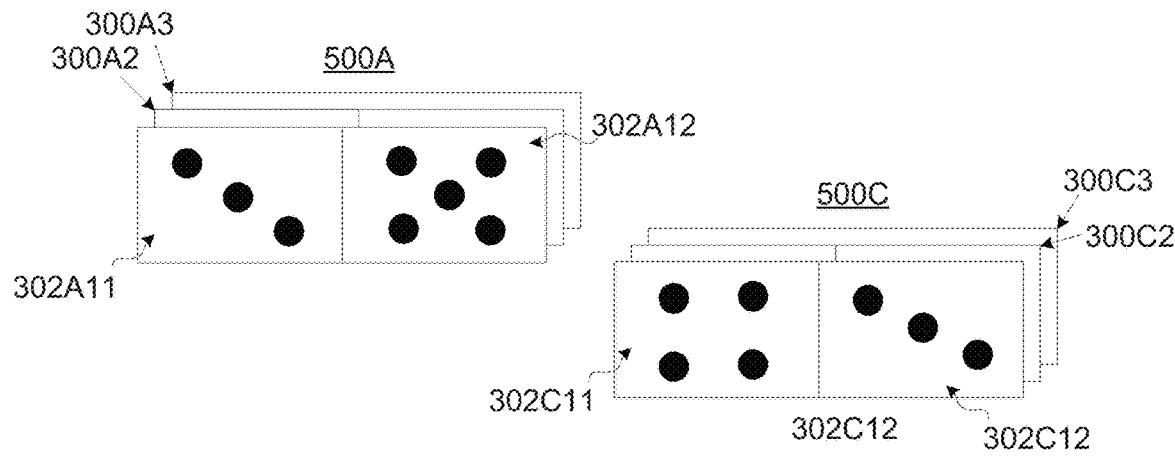
FIG. 6A, FIG. 6B and FIG. 6C are schematic illustrations of an exemplary display of a computer game altered according to an exemplary match between separable ends of stacked selectable objects, according to some embodiments of the present invention.
Figure 6B:
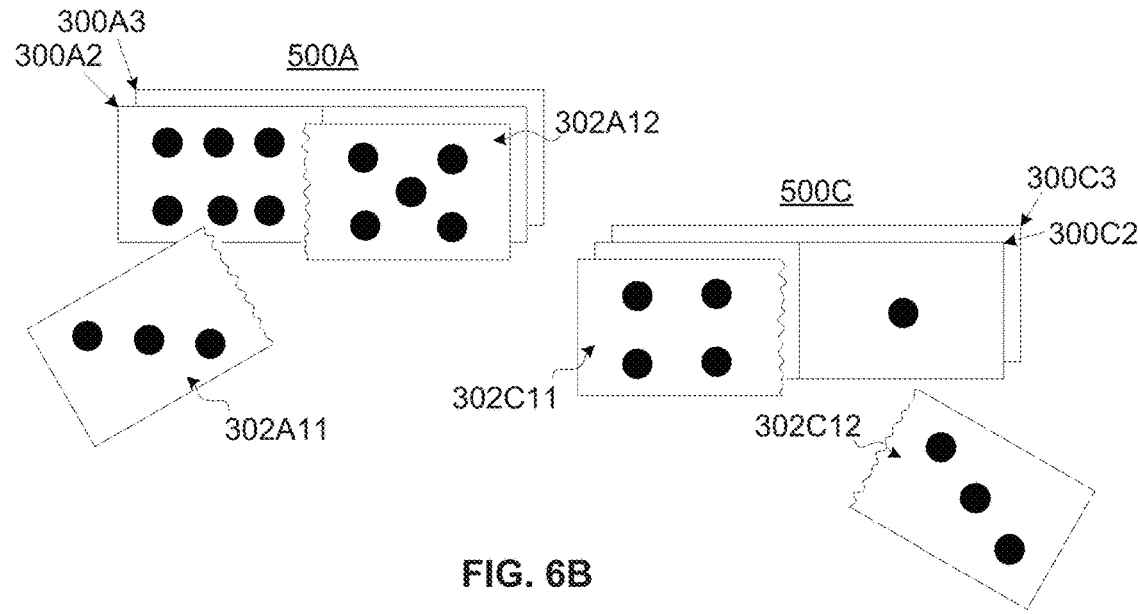
Figure 6C:
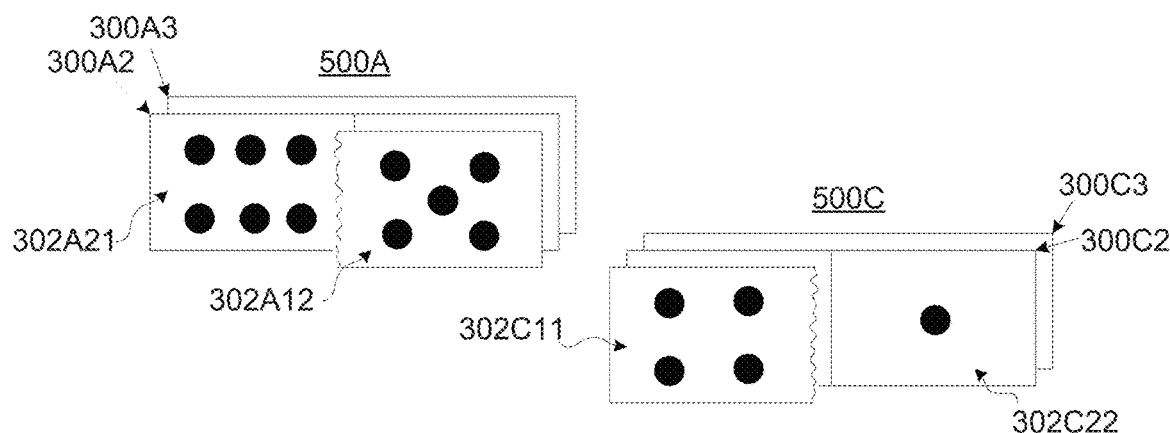

Reference is also made to FIG. 6A, FIG. 6B and FIG. 6C, which are schematic illustrations of an exemplary display of a computer game altered according to an exemplary match between separable ends of stacked selectable objects, according to some embodiments of the present invention.

As seen in FIG. 6A, the top layer selectable object 300A1 of the stack 500A may have two separable ends 302, a first separable end 302A11 marked with a three dots pattern and a second separable end 302A12 marked with a five dots pattern. The top layer selectable object 300C1 of the stack 500C may also have two separable ends 302, a first separable end 302C11 marked with a four dots pattern and a second separable end 302C12 marked with a three dots pattern.

Assuming that during the game, the game engine 220 receives user input indicating of a match between the separable end 302A11 and the separable end 302C12 both marked with the three dots pattern. In such case, after determining that the match indication is correct and the patterns of the separable ends 302A11 and 302C12 are identical, the game engine 220 may alter the display of the selectable object 300A1 and the selectable object 300C1, as seen in FIG. 6B, to break away the matched separable ends 302A11 and 302C12.

As seen in FIG. 6C, after the game engine 220 alters the display of the selectable object 300A1 and the selectable object 300C1 to remove the matched separable ends 302A11 and 302C12, the patterns marked on the separable ends 302 of the next lower layer of the stacks 500A and 500C are revealed. For example, a six dots pattern marked on a separable end 302A21 of the selectable object 300A2 which is the next lower layer of the stack 500A is reveled. In another example, a one dot pattern marked on a separable end 302C22 of the selectable object 300C2 which is the next lower layer of the stack 500C is reveled.

When a stack 500 becomes empty, i.e., all separable ends 302 of all its selectable object 300 are matched and removed, the game engine 220 may alter the display of the computer game and the selectable objects 300 to remove the empty stack. This means that following a successful match of a final (last) separable end 302 of a bottom most selectable object 300 of one or more of the stacks 500, the game engine 220 may alter the display to remove the matched last separable end 302 and thus remove the empty stack from the display.

It should be noted, that in case of two ended tiles such as, for example, the selectable objects 300A, when the game engine alters the display to remove the final separable end 302 of a bottom most selectable object 300 of a stack 500, the stack 500 may be in practice be also removed from the display. However, there may be cased, for example, for games using selectable objects such as, for example, selectable objects 300B, 300C and/or 300D, at least part of the bottom most selectable object 300 may still remain after altering the display to remove the final separable end 302 of a bottom most selectable object 300 of a stack 500. In such case, the game engine 220 may further alter the display to remove the remaining part(s) of the bottom most selectable object 300 of an empty stack 500.

Optionally, the game engine 220 may display each of the plurality of stacks 500 in association with a respective tray, for example, each stack 500 may be fixed on a respective tray. As such, following a match of a final (last) separable end 302 of a bottom most selectable object 300 of one or more of the stacks 500, such that the respective stack 500 is now empty, the game engine 220 may alter the display to display an empty tray and may further alter the display to remove the empty tray.

Reference is now made to FIG. 7A, FIG. 7B, FIG. 7C and FIG. 7D, which are schematic illustrations of an exemplary display of a computer game altered to remove empty stacks of selectable objects, according to some embodiments of the present invention.

Figure 7A:
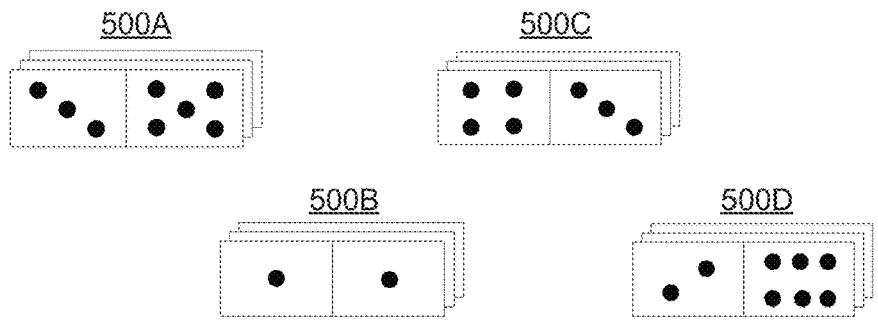
FIG. 7A, FIG. 7B, FIG. 7C and FIG. 7D are schematic illustrations of an exemplary display of a computer game altered to remove empty stacks of selectable objects, according to some embodiments of the present invention.

FIG. 7A illustrates a display of an exemplary initial state of a plurality of selectable objects such as the selectable objects 300 of a matching game displayed by a client device such as the client device 200. Each of the selectable objects 300 has a plurality of separable ends such as the separable ends 302 marked with patterns which may be matched to patterns marked on other separable ends 302 of other selectable objects 300. As seen, the selectable objects 300 are stacked in a plurality of stacks such as the stacks 500, for example, stacks 500A, 500B, 500C and 500D such that only the patterns marked on the selectable objects 300 at the top most layer of each stack 500 may be visible and available for matching (matchable).

Figure 7B:
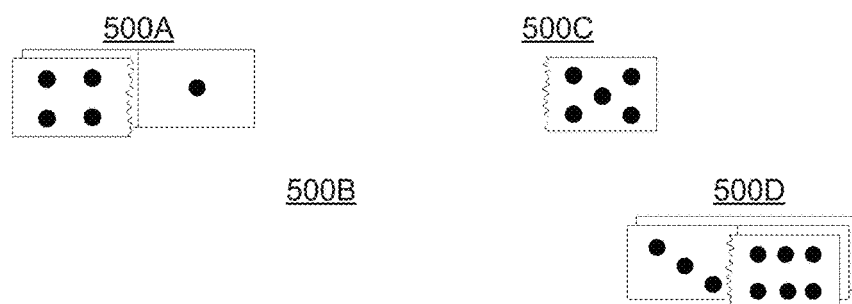

FIG. 7B illustrates a display an exemplary a later state of the selectable objects 300 at a later stage in the game after a plurality of successful matches were verified by a game engine such as the game engine 220. Following each successful match, the game engine 220 may alter the display to remove the matched separable ends 302. As seen, while only a single successful match was made for the stack 500D, the separable ends 302 of all selectable objects 300 of the stack 500B were separated, broken away and removed meaning that the stack 500B is empty. The game engine 220 may therefore alter the display to remove the empty stack 500B.

Figure 7C:
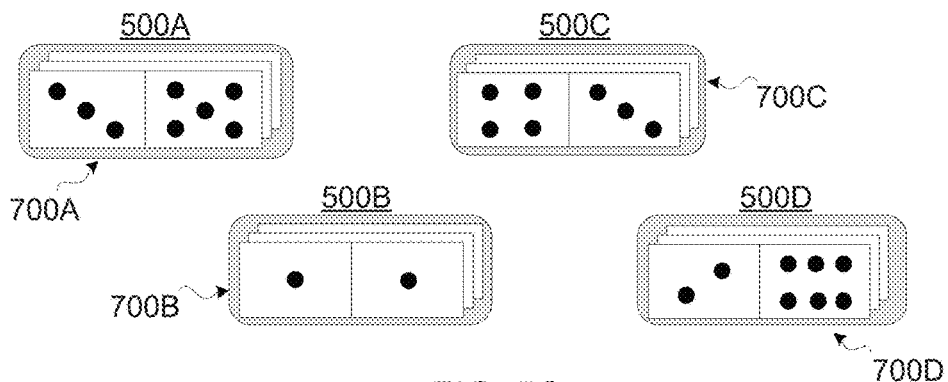
Figure 7D:
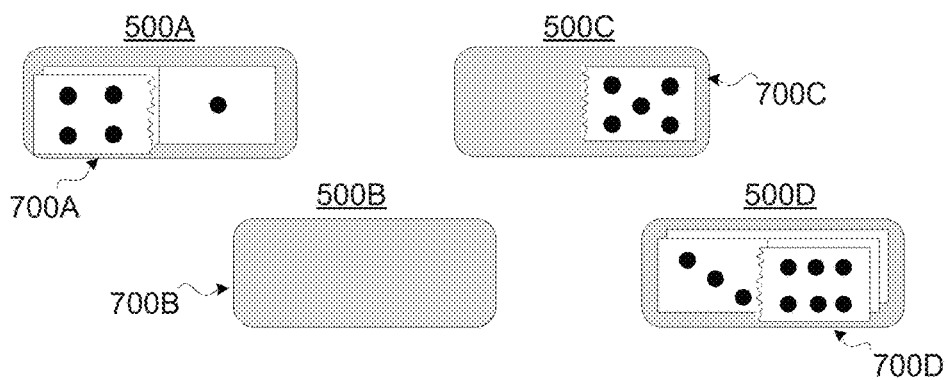

As seen in FIG. 7C, each of the stacks 500 may be associated with a respective tray 700, for example, fixed, overlaid, contained, and/or the like. For example, the stack 500A may be fixed on a tray 700A, the stack 500B may be fixed on a tray 700B, the stack 500C may be fixed on a tray 700C, and the stack 500D may be fixed on a tray 700D. As seen in FIG. 7D, after the game engine 220 alters the display to remove the final separable end 302 of the bottom most selectable object 300 of the stack 500B the stack 500B is empty such that there are no selectable objects 300 in the tray 700B. In such case, the game engine 220 may further alter the display to remove the empty tray 700B.

According to some embodiments of the present invention, the game engine 220 may alter the display of the game to present one or more new stacks 500 of selectable objects 300. Specifically, the game engine 220 may alter the display of the game such that the new stack(s) 500 appear following the removal of one or more empty stacks 500.

The game engine 220 may alter the display to display one or more new stacks 500 in the same location in which one or more empty stacks 500 were located before the display was altered to remove them. However, the game engine 220 may alter the display to display one or more new stacks 500 in one or more new locations.

Moreover, the game engine 220 may alter the display to add one or more new stacks 500 such that the new stack(s) 500 appear to form a new level in the computer game. For example, the game engine 220 may alter the display to shift the (images) stacks 500 displayed by the client device to one or more directions, for example, left-right, up-down, and/or a combination thereof, and add one or more new stacks 500 in areas of the display (screen) which are now clear (empty) thus delivering and/or inducing a sense and feeling of movement and advancement through levels of the computer game.

Figure 8A:
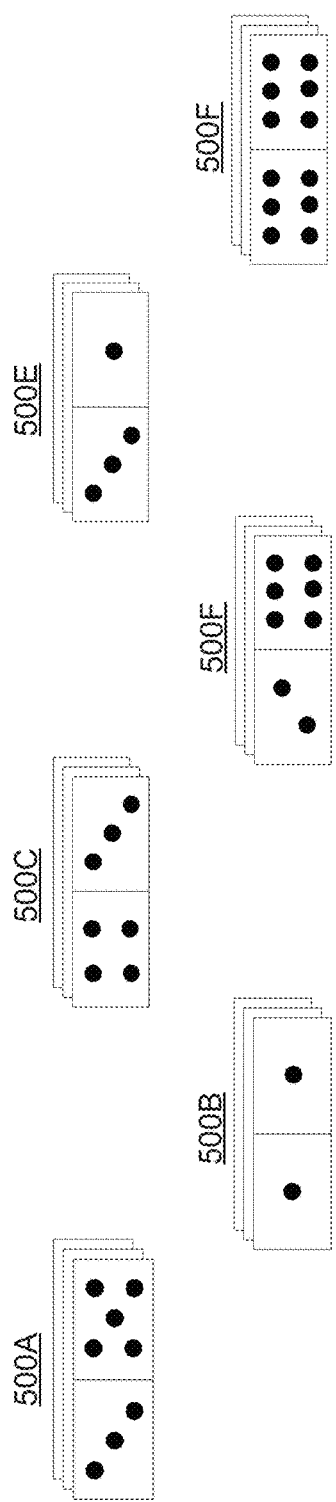
FIG. 8A and FIG. 8B are schematic illustrations of an exemplary display of a computer game altered to reveal new stacks of selectable objects following removal of empty stacks, according to some embodiments of the present invention.
Figure 8B:
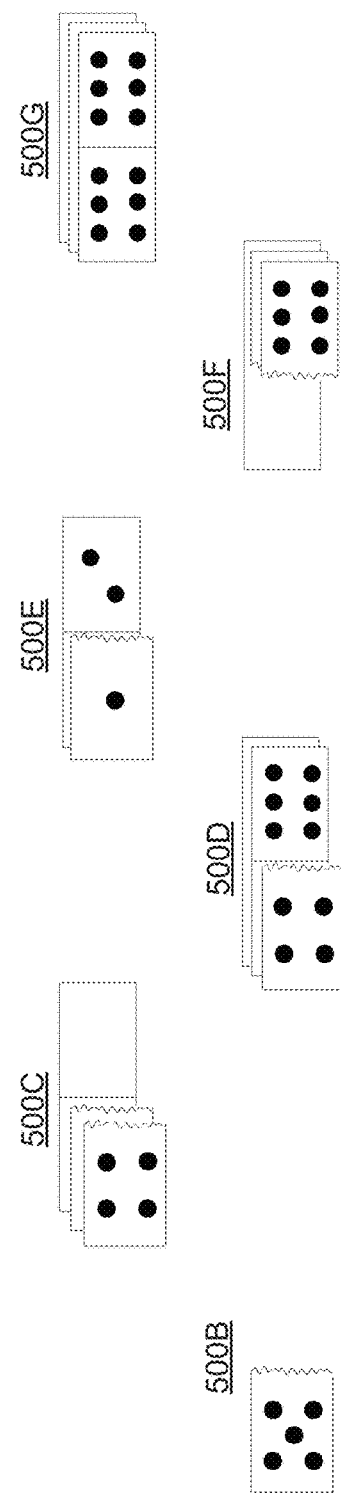

Reference is now made to FIG. 8A and FIG. 8B, which are schematic illustrations of an exemplary display of a computer game altered to reveal new stacks of selectable objects following removal of empty stacks, according to some embodiments of the present invention.

FIG. 8A illustrates a display of an exemplary first (earlier) state of a plurality of selectable objects such as the selectable objects 300 of a matching game displayed by a client device such as the client device 200. The selectable objects 300 may be arranged in a plurality of stacks such as the stacks 500, for example, stacks 500A, 500B, 500C, 500D, 500E and 500F each comprising multiple selectable objects 300, for example, three. Each of the selectable objects 300 has two separable ends such as the separable ends 302 marked with matchable patterns.

FIG. 8B illustrates a display of an exemplary second (later) state of the plurality of selectable objects 300 displayed by the client device 200 after multiple successful matches were made between separable ends 302 of some of the selectable objects 300 and a game engine such as the game engine 220 may alter the display to remove the matched separable ends 302.

As described herein before, the game engine 220 may further alter the display to remove empty stacks 500 in which all the selectable objects 300 were correctly matched and their separable ends 302 were removed. The game engine 220 may also alter the display to show one or more new stacks 500. For example, the game engine 220 may alter the display of the computer game to show one or more new stacks 500 after removing one or more empty stacks 500.

Moreover, the game engine 220 may alter the display such that the new stack(s) 500 may appear to form new levels in the computer game. For example, as seen in FIG. 8A and FIG. 8B, between the earlier state and the later state the left most stack 500A becomes empty, and the game engine 220 may therefore alter the display to remove it. As seen in FIG. 8B, the game engine 220 may further alter the display to shift the remaining stacks 500B, 500C, 500D, 500E and 500F to the left and add (introduce) a new stack 500G in the right most location of the screen thus inducing a sense of movement and/or advancement to the right to unveil and/or enter a new level of the computer game.

According to some embodiments of the present invention the game engine 220 may alter the display of the computer game, specifically the display (image) of one or more of the plurality of selectable objects 300 to lock one or more of their separable ends 302 thus prohibiting the locked separable ends 302 for matching and limiting the match options for the user 202 playing the matching game.

Figure 9:
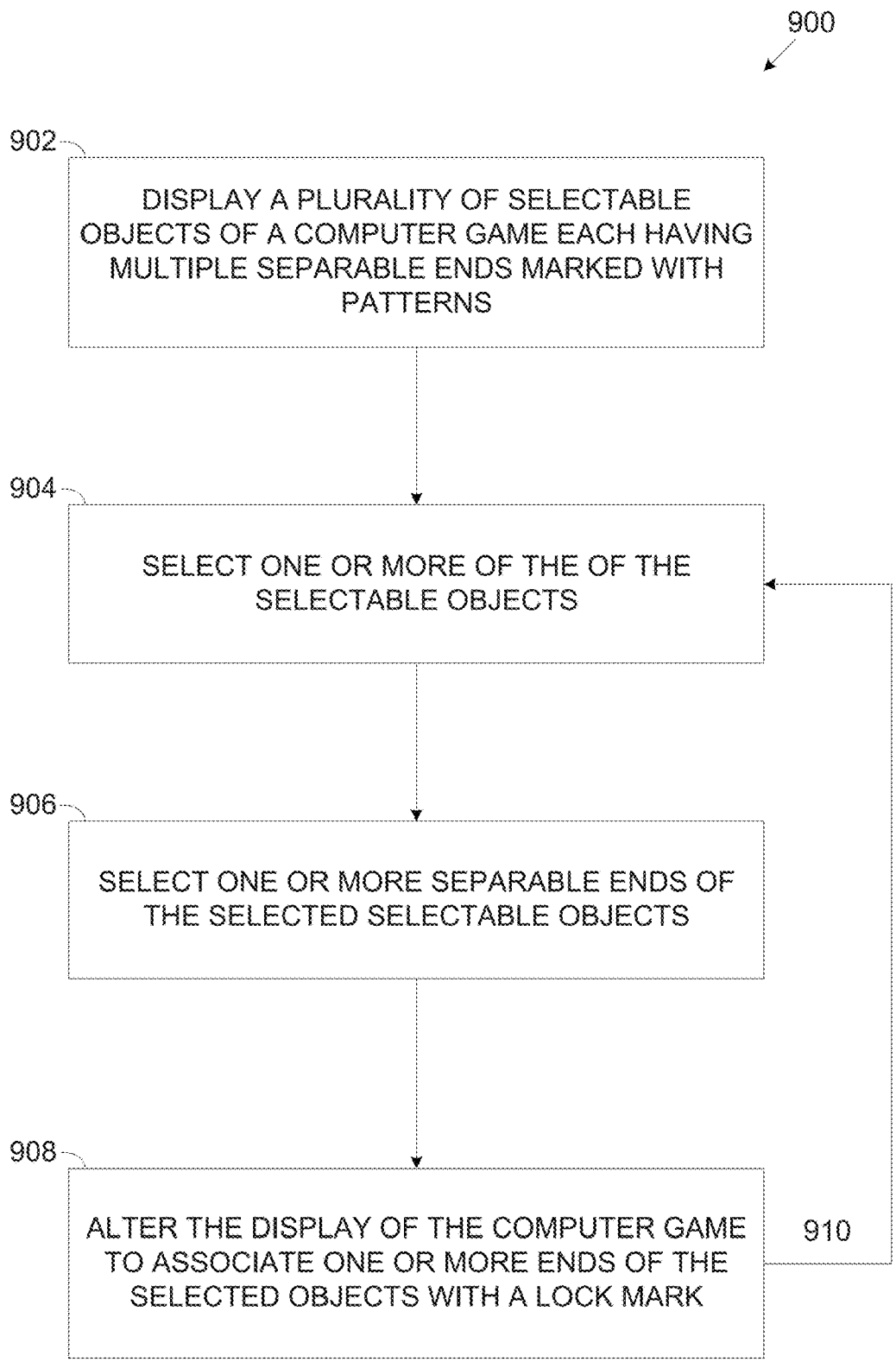
FIG. 9 is a flowchart of an exemplary process of altering a display of a computer game to limit match options of selectable objects having separable ends, according to some embodiments of the present invention.

Reference is now made to FIG. 9, which is a flowchart of an exemplary process of altering a display of a computer game to limit match options of selectable objects having separable ends, according to some embodiments of the present invention.

An exemplary process 900 may be executed by a game engine such as the game engine 220 to alter a display of a computer game, in particular a matching game, displayed by a client device such as the client device 200 to a user such as the user 202 using the client device 200 to play the game, for the user 202 to limit matching options for the user 202.

The matching game may challenge the user 202 to match between patterns marked on separable ends such as the separable ends 302 of a plurality of selectable objects (items) of the computer game, for example, a domino tile, a card, and/or the like each having a plurality of separable ends 302 which may be detached and removed from their (parent) respective selectable objects 300.

As shown at 902, the process 900 starts with the game engine 220 presenting a game to a user 202 via a user interface such as the user interface 210 of the client device 200. In particular, the game engine 220 may display objects, items and/or assets of the game by instructing, operating, altering and/or otherwise controlling one or more screens of the client device 200.

Moreover, the user 202 may play the game by interacting with the game engine 220 via one or more input interfaces supported by the user interface 210 of the client device 200. For example, the user 202 may operate a pointing device, a keyboard and/or the like of the client device 200 to select, for example, click, point, choose, adjust, write, and/or the like one or more of the game's objects, items and/or assets which are thus collectively designated selectable objects.

The game may be a matching game, for example, a domino game, a memory game, and/or the like in which each of the plurality of selectable objects has a plurality of ends, for example, 2 ends, 3 ends, 4, ends, and/or the like each marked with one of a plurality of patterns where the user 202 has to match between object ends marked with similar and/or identical patterns.

As shown at 904, the game engine 220 may select one or more of the plurality of selectable objects 300 displayed by the client device 200.

The game engine 200 may apply one or more methods for selecting the selectable objects 300. For example, the game engine 200 may select one or more of the selectable objects 300 arbitrarily and/or randomly, for example, using one or more random number generators which may be operated to generate one or more random numbers that may be mapped to identifiers of one or more of the selectable objects 300. In another example, the game engine 200 may select one or more of the selectable objects 300 according to one or more predefined selection patterns and/or methodologies, for example, a predefined location, a predefined order, and/or the like.

As shown at 906, the game engine 220 may select one or more of the separable ends 302 of the selected selectable object(s) 300.

As described in step 904, the game engine 200 may apply one or more methods for selecting the separable end(s) 302, for example, arbitrary selection, random selection, using predefined selection patterns and/or the like.

As shown at 908, the game engine 220 may alter the display of the selected selectable object(s) 300 by associating a lock mark with the selected separable end(s) 302 of the selected selectable object(s) 300.

The lock mark may indicate to the user 202 that the associated separable end(s) 302 is prohibited for matching with the separable end(s) 302 of one or more of the other selectable objects 300 displayed to the user 202 on the screen of the client device 200.

The game engine 220 may apply one or more techniques, and/or visualization modes for configuring, shaping, and/or illustrating the lock marks. For example, the game engine 220 may alter the display to add one or more lock marks covering the selected separable end(s) 302. In another example, the game engine 220 may alter the display to add one or more lock marks attached to one or more of the selected separable end(s) 302.

Moreover, the game engine 220 may alter the display such that the lock mark(s) associated with one or more of the selected separable end(s) 302 does not conceal the pattern marked on the respective separable end 302 of the respective selectable object 300 thus making the pattern visible to the user 202. However, the game engine 220 may optionally alter the display such that the lock mark(s) associated with the selected separable end(s) 302 300 conceals the pattern marked on the respective separable end 302 of the respective selectable object 300 thus making the pattern invisible to the user 202.

Figure 10:
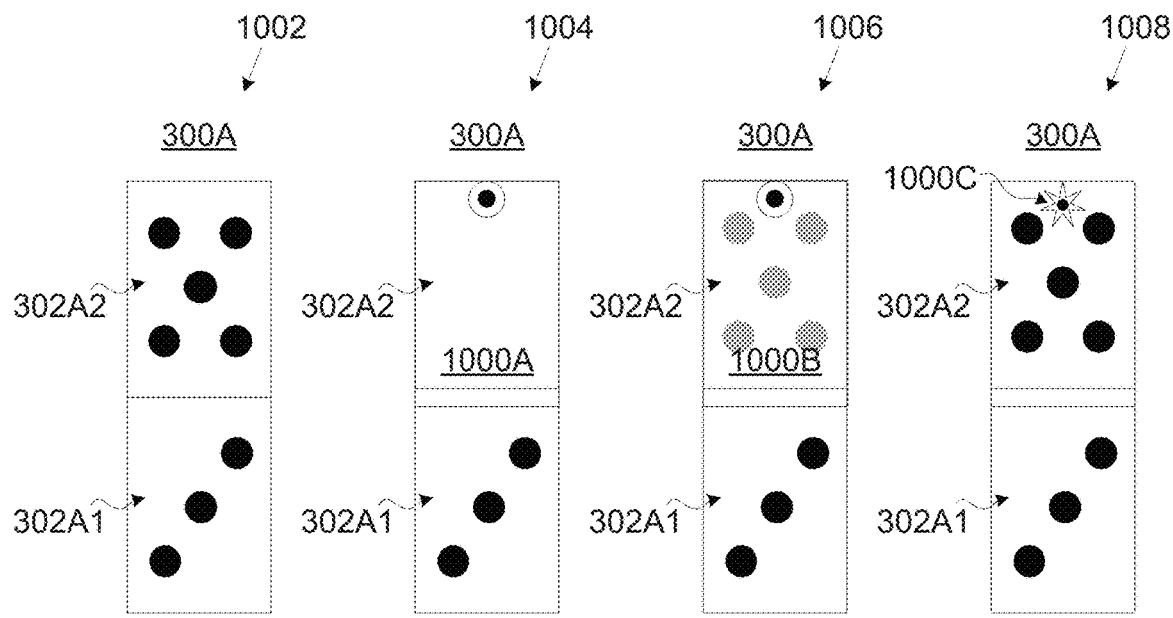
FIG. 10 is a schematic illustration of an exemplary display of a computer game showing exemplary lock marks in association with separable ends of selectable objects of a computer game, according to some embodiments of the present invention.

Reference is now made to FIG. 10, which is a schematic illustration of an exemplary display of a computer game showing exemplary lock marks in association with separable ends of selectable objects of a computer game, according to some embodiments of the present invention.

As seen in 1002, an exemplary selectable object 300A such as the selectable objects 300 of a computer game, for example, a domino tile of a domino based matching game displayed by a client device such as the client device 200 to a user such as the user 202 using the client device 200 to play the matching game. As described herein before, the selectable object 300A may have a plurality of separable ends such as the separable ends 302, for example, two separable ends 302A1 and 302A2 marked with three dots and five dots patterns respectively.

A game engine such as the game engine 220 may alter the display of the computer game, specifically the display of the selectable object 300A to associate a lock mark with one or more of its separable ends 302A1 and 302A2 thus prohibiting the user 202 from matching the locked separable ends 302A1 and/or 302A2.

As seen in 1004, an exemplary lock mark 1000A may be displayed in association with the separable end 302A2 in solid mode such that the pattern marked on the separable end 302A2 is invisible. As seen in 1006, an exemplary lock mark 1000B may be displayed in association with the separable end 302A2 in at least partially transparent mode such that the pattern marked on the separable end 302A2 is visible through the lock mark 1000B. As seen in 1006, an exemplary lock mark 1000C may be displayed in association with the separable end 302A2 such that it does not cover the pattern marked on the separable end 302A2 and the pattern is visible.

Reference is made once again to FIG. 9.

As shown at 910, the process 900 may branch back to repeat steps 904-908 such that the game engine 220 may repeat selection of one or more of the selectable objects 300 of the computer game and their separable ends 302 and alter the display of the selected selectable object(s) 300 accordingly by associating a lock mark with the selected separable end(s) 302.

The game engine 220 may apply one or more modes, methods and/or techniques for repeating selection of one or more separable ends 302 of one or more selectable objects 300 which are associated with lock marks and thus prohibited for matching.

For example, the game engine 220 may periodically select one or more separable ends 302 of one or more of the plurality of selectable objects 300 and alter the display accordingly to associate the selected separable end(s) 302 with a lock mark. For example, the game engine 220 may select one or more separable ends 302 of one or more of the plurality of selectable objects 300 and alter the display accordingly every predefined and/or randomly selected time period, for example, every minute, every two minutes, every five minutes, and/or the like. In another example, the game engine 220 may select one or more separable ends 302 of one or more of the plurality of selectable objects 300 and alter the display accordingly every predefined and/or randomly selected number of moves (turns) of the user 202 playing the computer game, for example, every move, every two moves, every five moves, and/or the like.

The game engine 220 may apply one or more selection rules, methods and/or modes for reselecting selectable object(s) 300 and their separable end(s) 302 to associate them with lock mark(s) thus prohibiting them for matching by the user 202 and alter the display accordingly.

For example, the game engine 220 may select one or more separable ends 302 which are not currently locked, i.e., associated with a lock mark. In another example, the game engine 220 may select one or more separable ends 302 among all of the selectable objects 300 regardless of which is currently locked or not. In another example, the game engine 220 may select one or more separable ends 302 of one or more selectable objects 300 which have other separable end(s) 302 that are currently locked. In other words, the game engine 220 may switch between separable ends 302 of the same selectable object(s) 300 and associate another one or more separable ends 302 of the same selectable object(s) 300 with the lock mark.

Figure 11:
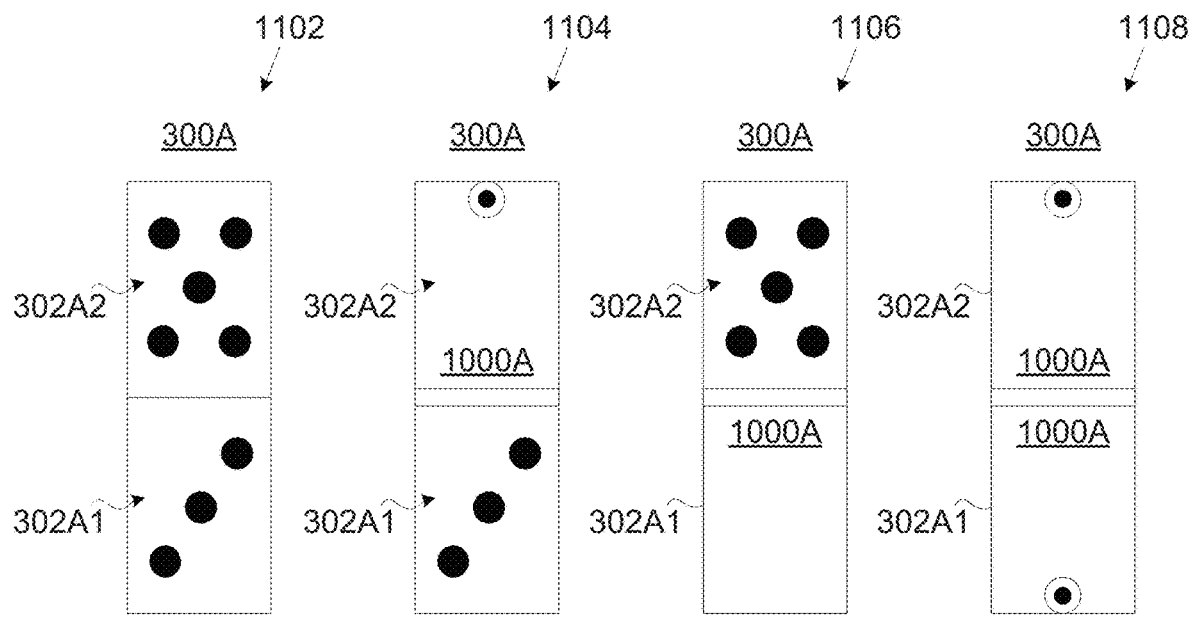
FIG. 11 is a schematic illustration of an exemplary display of a computer game altered to periodically move exemplary lock marks between separable ends of selectable objects of a computer game, according to some embodiments of the present invention.

Reference is now made to FIG. 11, which is a schematic illustration of an exemplary display of a computer game altered to periodically move exemplary lock marks between separable ends of selectable objects of a computer game, according to some embodiments of the present invention.

As seen in 1102, an exemplary selectable object 300A such as the selectable objects 300 of a computer game, for example, a domino tile of a domino based matching game displayed by a client device such as the client device 200 to a user such as the user 202 using the client device 200 to play the matching game. As described herein before, the selectable object 300A may have a plurality of separable ends such as the separable ends 302, for example, two separable ends 302A1 and 302A2 marked with three dots and five dots patterns respectively.

As seen 1104, a game engine such as the game engine 220 may alter the display of the computer game, specifically the display of the selectable object 300A to associate a lock mark with one or more of its separable ends 302, for example, the second separable end 302A2 thus prohibiting the user 202 from matching the locked separable end 302A2.

As seen 1106, the game engine 220 may periodically alter the display of the selectable object 300A, for example, after every move made by the user 202 to associate a lock mark with another one of its separable ends 302, for example, the first separable end 302A1 thus prohibiting the user 202 from matching the locked separable end 302A1.

As seen 1108, when periodically altering the display of the selectable object 300A, the game engine 220 may further alter the display of the selectable object 300A to associate lock marks with both the separable ends 302A1 and 302A2 of the selectable object 300A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms matching game, and game engine architecture are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of altering display of selectable objects having multiple matchable ends in a computer game, comprising:
   using at least one processor for:
      displaying a plurality of selectable objects of a computer game displayed by a client device, each of the plurality of selectable objects initially has a plurality of separable ends, each of the plurality of separable ends of each of the plurality of selectable objects is marked with one of a plurality of patterns;
      receiving user input comprising a match indication of at least one match between separable ends of at least two of the plurality of selectable objects marked with a common pattern of the plurality of patterns; and
      altering the display of at least one of the at least two selectable objects by breaking away and removing the matched separable end of the at least one selectable object in case the at least one match indicated by the match indication is correct,
      wherein the plurality of selectable objects are arranged in a plurality of stacks, each of the plurality of stacks initially comprises at least two selectable objects stacked such that each separable end of a higher layer of the respective stack conceals a corresponding separable end of each lower layer selectable object of the respective stack,
      wherein following a successful match of a final separable end of a bottom most selectable object of at least one of the plurality of stacks such that the at least one stack is empty, the display is altered to remove the empty stack.

2. The method of claim 1, wherein the plurality of selectable objects are tiles having two separable ends each marked with a respective one of the plurality of patterns.

3. The method of claim 1, wherein after at least one separable end of the top selectable object is broken away, a respective separable end of the lower layer selectable object is revealed and made available for matching.

4. The method of claim 1, further comprising each of the plurality of stacks is fixed on a respective tray, wherein the display is altered to remove the tray of each stack that is empty following a successful match of a final separable end of a bottom most selectable object of the respective stack.

5. The method of claim 1, further comprising altering the display to present at least one new stack of selectable objects which appears following the removal of the empty stack.

6. The method of claim 5, further comprising the at least one new stack appears in the display to form a new level in the computer game.

7. A system for altering display of selectable objects having multiple matchable ends in a computer game, comprising:
   a memory for storing program code; and
   at least one processor coupled to the memory, the at least one processor is configured to execute the program code, the program code comprising:

code instructions to display a plurality of selectable objects of a computer game displayed by a client device, each of the plurality of selectable objects initially has a plurality of separable ends, each of the plurality of separable ends of each of the plurality of selectable objects is marked with one of a plurality of patterns, code instructions to receive user input comprising a match indication of at least one match between separable ends of at least two of the plurality of selectable objects marked with a common pattern of the plurality of patterns, and code instructions to alter the display of at least one of the at least two selectable objects by breaking away and removing the matched separable end of the at least one selectable object in case the at least one match indicated by the match indication is correct, wherein the plurality of selectable objects are arranged in a plurality of stacks, each of the plurality of stacks initially comprises at least two selectable objects stacked such that each separable end of a higher layer of the respective stack conceals a corresponding separable end of each lower layer selectable object of the respective stack, wherein following a successful match of a final separable end of a bottom most selectable object of at least one of the plurality of stacks such that the at least one stack is empty, the display is altered to remove the empty stack.

8. A method of limiting match options for selectable objects having multiple matchable ends in a computer game, comprising:

using at least one processor for:

displaying a plurality of selectable objects of a computer game displayed by a client device, each of the plurality of selectable objects initially has a plurality of separable ends, each of the plurality of separable ends of each of the plurality of selectable objects is marked with one of a plurality of patterns; and altering the display of at least one of the plurality of selectable objects by associating a lock mark with at least one separable end of at least one of the plurality of selectable objects, the lock mark indicating that the associated at least one separable end is prohibited for matching with at least one separable end of at least another one of the plurality of selectable objects, wherein the lock mark is configured to conceal the pattern marked on the at least one separable end of the at least one selectable object.

9. The method of claim 8, wherein the lock mark is configured such that the pattern marked on the at least one separable end of the at least one selectable object is visible.

10. The method of claim 8, further comprising periodically altering the display to select at least one separable end of at least one of the plurality of selectable objects and associate the at least selected separable end with a lock mark.

11. The method of claim 10, wherein the display is periodically altered to switch between separable ends of the at least one selectable object and associate at least another one separable end of the at least one selectable object with the lock mark.

12. The method of claim 11, wherein the display is altered to switch between the separable ends of the at least one selectable object after every user move.

13. A system for limiting match options for selectable objects having multiple matchable ends in a computer game, comprising:

a memory for storing program code; and at least one processor coupled to the memory, the at least one processor is configured to execute the program code, the program code comprising:

code instructions to display a plurality of selectable objects of a computer game displayed by a client device, each of the plurality of selectable objects initially has a plurality of separable ends, each of the plurality of separable ends of each of the plurality of selectable objects is marked with one of a plurality of patterns, and code instructions to alter the display of at least one of the plurality of selectable objects by associating a lock mark with at least one separable end of at least one of the plurality of selectable objects, the lock mark indicating that the associated at least one separable end is prohibited for matching with at least one separable end of at least another one of the plurality of selectable objects, wherein the lock mark is configured to conceal the pattern marked on the at least one separable end of the at least one selectable object.

\* \* \* \* \*